US008633993B2

(12) United States Patent
Sasaki et al.

(10) Patent No.: US 8,633,993 B2
(45) Date of Patent: Jan. 21, 2014

(54) FLEXIBLE WIRING BOARD MOUNTING STRUCTURE OF AN IMAGE SHAKE CORRECTING APPARATUS

(75) Inventors: Takamitsu Sasaki, Saitama (JP); Shinsuke Shoji, Saitama (JP); Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 631 days.

(21) Appl. No.: 12/767,015

(22) Filed: Apr. 26, 2010

(65) Prior Publication Data

US 2010/0277604 A1 Nov. 4, 2010

(30) Foreign Application Priority Data

Apr. 30, 2009 (JP) ................................ 2009-111453

(51) Int. Cl.

*H04N 5/228* (2006.01)
*H04N 5/225* (2006.01)
*G03B 17/00* (2006.01)

(52) U.S. Cl.

USPC ......................... 348/208.4; 348/374; 396/542

(58) Field of Classification Search

USPC ........... 348/360, 208.99, 208.2–208.4, 208.7, 348/208.11; 396/348–350, 542

See application file for complete search history.

(56) References Cited

U.S. PATENT DOCUMENTS

| | | | | |
|---|---|---|---|---|
| 7,435,016 | B2 | 10/2008 | Nomura | |
| 8,057,111 | B2 * | 11/2011 | Lee et al. | 396/348 |
| 2006/0115261 | A1 | 6/2006 | Nomura | |
| 2007/0002546 | A1 | 1/2007 | Nomura et al. | |
| 2007/0019084 | A1 | 1/2007 | Nomura et al. | |
| 2007/0077805 | A1 * | 4/2007 | Nomura et al. | 439/331 |
| 2007/0182824 | A1 * | 8/2007 | Nomura et al. | 348/208.99 |

FOREIGN PATENT DOCUMENTS

| | | |
|---|---|---|
| JP | 2006-157833 | 6/2006 |
| JP | 2007-116481 | 5/2007 |

* cited by examiner

*Primary Examiner* — James Hannett
*Assistant Examiner* — Carramah J Quiett
(74) *Attorney, Agent, or Firm* — Greenblum & Bernstein P.L.C.

(57) ABSTRACT

A flexible wiring board mounting structure of an image shake correcting apparatus, the image shake correcting apparatus includes a image sensor serving as a part of a photographing optical system and capable of moving in directions orthogonal to an optical axis of the photographing optical system, a control circuit mounted to an element independent of the image sensor, and a flexible wiring board which connects the image sensor and the control circuit to each other. The flexible wiring board includes an inner side connecting portion connected to the image sensor, an outer side connecting portion connected to the control circuit, and a flexible portion provided in an allowance space defined between the inner side connecting portion, the outer side connecting portion, the image sensor and an inner peripheral surface of an innermost ring member, out of ring members that support lens groups of the photographing optical system.

14 Claims, 20 Drawing Sheets

Fig. 15A(1)
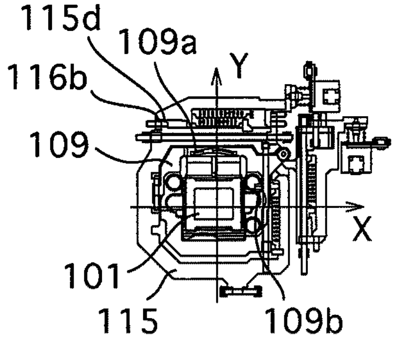
Fig. 15A(2)
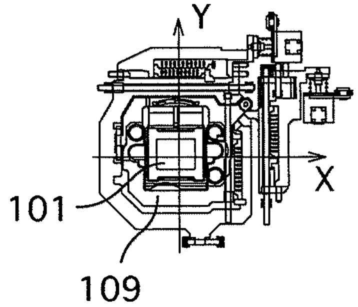
Fig. 15A(3)
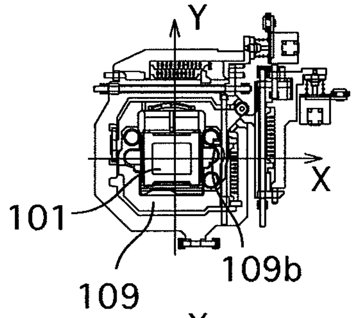
Fig. 15A(4)
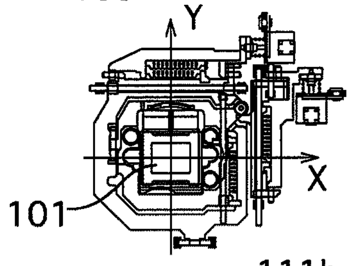
Fig. 15A(5)
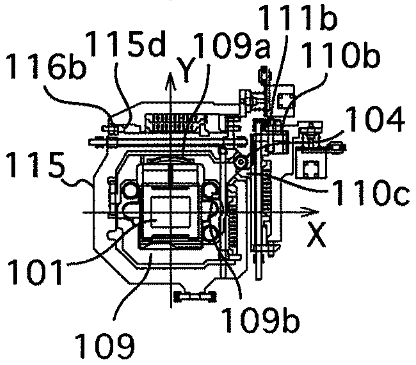

Fig. 15B(1)
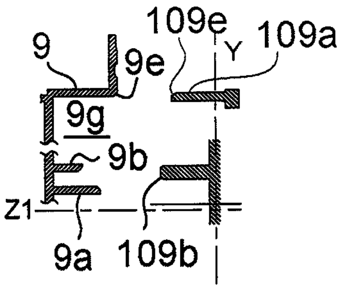
Fig. 15B(2)
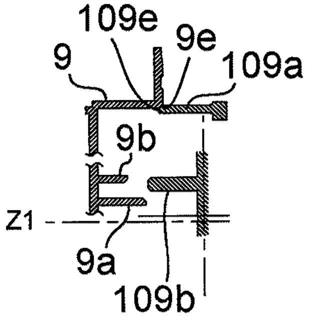
Fig. 15B(3)
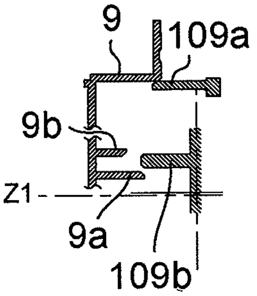
Fig. 15B(4)
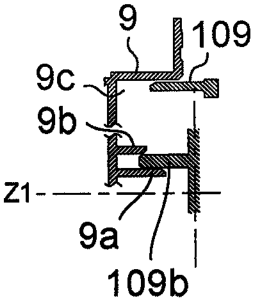
Fig. 15B(5)
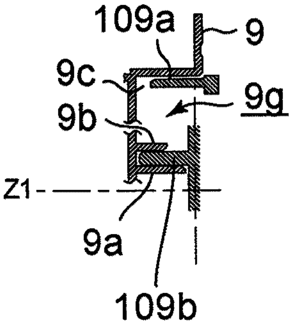

Fig. 15C(1)
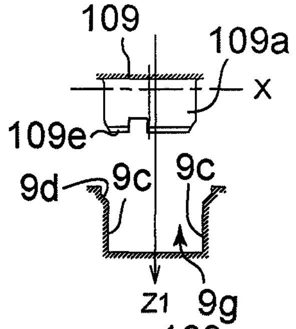
Fig. 15C(2)
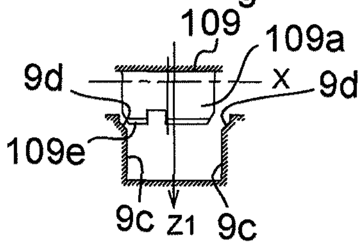
Fig. 15C(3)
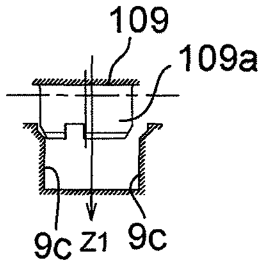
Fig. 15C(4)
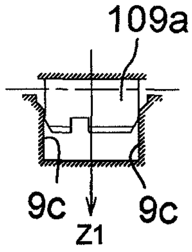
Fig. 15C(5)
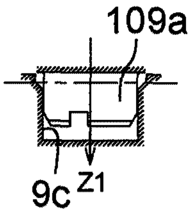

Fig. 16A(1)
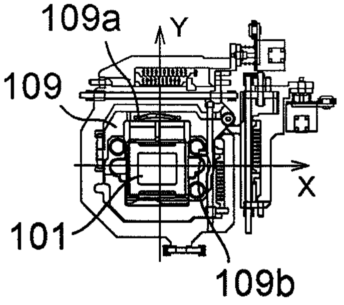
Fig. 16A(2)
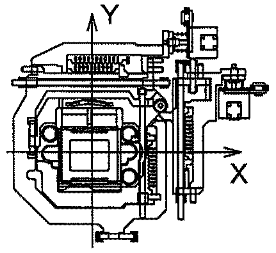
Fig. 16A(3)
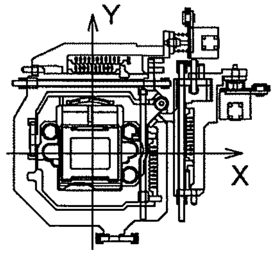
Fig. 16A(4)
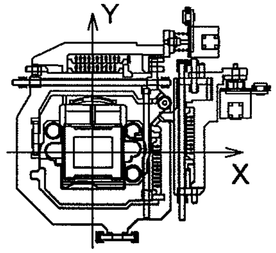
Fig. 16A(5)
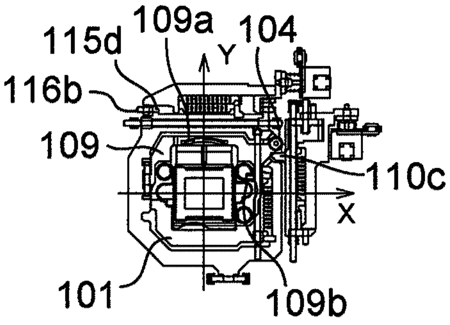

Fig. 16B(1)
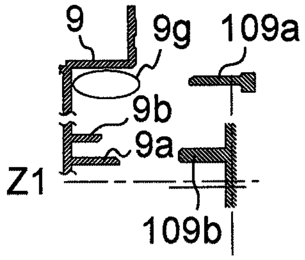
Fig. 16B(2)
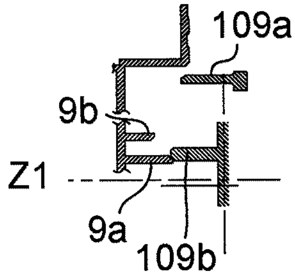
Fig. 16B(3)
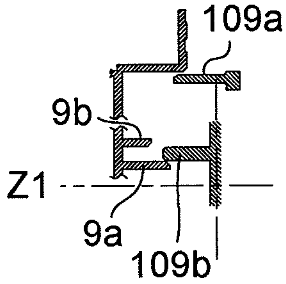
Fig. 16B(4)
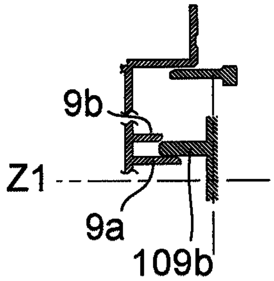
Fig. 16B(5)
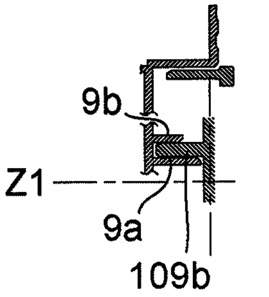

Fig. 16C(1)
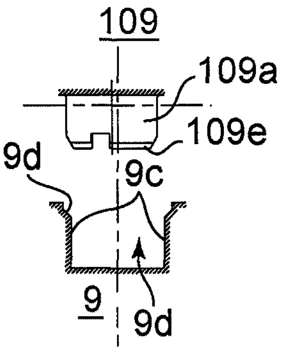
Fig. 16C(2)
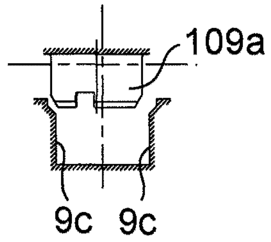
Fig. 16C(3)
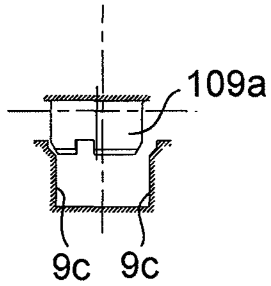
Fig. 16C(4)
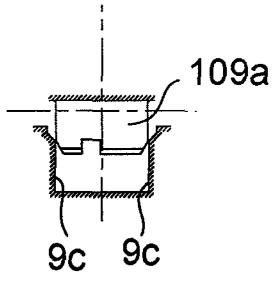
Fig. 16C(5)
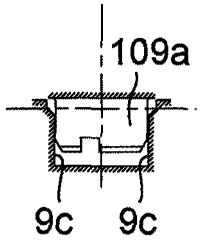

FLEXIBLE WIRING BOARD MOUNTING STRUCTURE OF AN IMAGE SHAKE CORRECTING APPARATUS

BACKGROUND OF THE INVENTION

1. Field of the Invention

The present invention relates to a flexible wiring board mounting structure of an image shake correcting apparatus, and in particular, relates to a flexible wiring board mounting structure of an image shake correcting apparatus (image-stabilizing apparatus) for connecting a image-stabilizing element (e.g., an image sensor or a lens element), which is moved in a direction to correct/stabilize image shake upon the occurrence of image shake, to a control circuit for image shake correction control.

2. Description of the Related Art

In conventional lens units which incorporate an image shake correcting apparatus for driving an image sensor to move (in a direction opposite to that of the shaking motion) when an image shake correcting operation is performed, an image sensor (image pickup device) and another circuit provided inside a camera body (e.g., a circuit for driving the image sensor or processing image signals captured by the image sensor) are electrically connected to each other via a flexible wiring board (flexible printed wiring board; hereinafter referred also to as a flexible PWB) (see Patent Japanese Unexamined Patent Publication Nos. 2007-116481 and 2006-157833).

In the related art, a flexible PWB is laid outside of a stationary barrel, to which the image shake correcting apparatus is fixed. However, such a structure increases the size of the camera and also requires a long flexible PWB, which causes attenuation of signals sent through the flexible PWB, renders the signals susceptible to noise and also causes electrical loss.

SUMMARY OF THE INVENTION

The present invention has been devised in view of the above described problems of the related art and provides a flexible wiring board mounting structure, or a flexible wiring board arrangement structure, of an image shake correcting apparatus which makes it possible to achieve miniaturization of an image shake correcting apparatus and peripheral parts thereof, thus making it possible to achieve a reduction in length of the flexible wiring board.

According to an aspect of the present invention, a flexible wiring board mounting structure of an image shake correcting apparatus is provided, the image shake correcting apparatus including an image sensor serving as a part of a photographing optical system and capable of moving in directions orthogonal to an optical axis of the photographing optical system, a control circuit mounted to an element independent of the image sensor, and a flexible wiring board which connects the image sensor and the control circuit to each other, wherein the photographing optical system includes a plurality of lens groups, each of which is supported by a ring member. The flexible wiring board includes an inner side connecting portion connected to the image sensor, an outer side connecting portion connected to the control circuit, and a flexible portion provided in an allowance space, wherein the allowance space is defined between the inner side connecting portion, the outer side connecting portion, the image sensor and a cylindrical inner peripheral surface of an innermost ring member, out of the ring members that support the plurality of lens groups of the photographing optical system.

Accordingly, the flexible wiring board does not prevent the image sensor from moving due to the flexible portion being provided, which makes it possible to reduce the length of the flexible wiring board.

It is desirable for the flexible portion to include a first jutting portion which is bent at an end of the inner side connecting portion to extend forward in the optical axis direction within the allowance space, and a second jutting portion which is folded back to extend rearward in the optical axis direction at a position radially outward from a position of the first jutting portion, a rear end of the second jutting portion being bent in a direction away from the optical axis to be continuous with the outer side connecting portion.

It is desirable for the flexible portion to include a connecting portion via which front ends of the first jutting portion and the second jutting portion are connected to each other so that the second jutting portion is folded back from the first jutting portion via the connecting portion, the connecting portion extending in a direction substantially orthogonal to the optical axis.

It is desirable for the innermost ring member to be movable in the optical axis direction, and for a guard member to be provided between the flexible portion and the cylindrical inner peripheral surface of the innermost ring member.

It is desirable for the image sensor to be provided on one of a pair of mutually parallel in-plane moving members which move relative to each other in mutually orthogonal directions to each other, while maintaining a parallel state with each other and lying on planes that are orthogonal to the optical axis, wherein the flexible portion extends forward in the optical axis direction through an opening provided in at least one of the mutually parallel in-plane moving members.

It is desirable for the image shake correcting apparatus to include a pair of mutually parallel in-plane moving members which move relative to each other in two orthogonal directions while maintaining a parallel state with each other, wherein one of the in-plane moving members is mounted to the other of the in-plane moving members, the image sensor being mounted to the one of the in-plane moving members, and the flexible portion juts forward through an opening formed in, the one of the in-plane moving members, to which the image sensor is mounted.

It is desirable for a guard member to be provided in between the innermost ring member and the flexible portion that extends forward in the optical axis direction through the opening.

It is desirable for one of the in-plane moving members, to which the image sensor is mounted, to include a guide member positioned between the flexible portion that extends forward in the optical axis direction and the cylindrical inner peripheral surface of the innermost ring member.

Since the flexible portion of the flexible wiring board flexibly bends, there is a possibility of the flexible portion interfering with a moving member if it is positioned in the vicinity of the flexible portion. However, the guide member prevents the flexible portion from interfering with such a moving member.

It is desirable for a lens group, of the plurality of lens groups, that is provided closest to the image sensor is supported by a lens frame having a flange that outwardly and radially extends in a direction orthogonal to the optical axis. The flexible portion, which juts forward in the optical axis direction through the opening, is positioned in a space defined by the guard member, the image sensor and the flange.

It is desirable for the image shake correcting apparatus to be provided in a retractable zoom lens, and the innermost ring member to be one of a movable lens barrel and a movable lens support frame that retreats in the optical axis direction when the zoom lens is fully retracted from a ready-to-photograph state to an accommodated state. If the image sensor has deviated from an initial position, a forced-driving portion formed on the innermost ring member comes into sliding contact with the guide member to force the image sensor to shift to the initial position when the zoom lens is fully retracted.

It is desirable for the forced-driving portion and the guide member to limit a first movement of the image sensor in one of two directions orthogonal to the optical axis and to limit a second movement of the image sensor in the other of the two directions, wherein the two direction are mutually orthogonal to each other.

It is desirable for the one in-plane moving member, to which the image sensor is mounted, to include a second guide member formed at a different position from the guide member. A second forced-driving portion is provided on one of the movable lens barrel and the movable lens support frame. The second guide member and the second forced-driving portion limits the second movement of the image sensor in the other of the two directions.

It is desirable for at least one slit to be formed in the flexible portion to split the flexible portion into at least two portions.

In addition, in an embodiment according to the present invention, the element (one in-plane moving member) to which the image sensor is mounted is provided with a guide member between the flexible portion that extends forward in the optical axis direction and a moving member located at a position farther from the optical axis than the flexible portion, and accordingly, the flexible portion is prevented from interfering with the moving member to be protected therefrom.

Additionally, in another embodiment according to the present invention, a movable lens barrel or a movable lens support frame is provided with a forced driving portion which comes into sliding contact with the guide portion to force the image sensor to shift to the initial position when the zoom lens is fully retracted, and accordingly, the image sensor is shifted to the initial position when the zoom lens is fully retracted, which eliminates the possibility of the moving member interfering with the flexible portion.

The present disclosure relates to subject matter contained in Japanese Patent Application No. 2009-111453 (filed on Apr. 30, 2009) which is expressly incorporated herein by reference in its entirety.

BRIEF DESCRIPTION OF THE DRAWINGS

The present invention will be described below in detail with reference to the accompanying drawings in which:

FIGS. 15A(1) through 15A (5), 15B(1) through 15B(5) and 15C(1) through 15C(5) are diagrams illustrating sequential operations of the zoom lens barrel when being fully retracted from a state where the X-direction moving stage and the Y-direction moving stage are eccentrically positioned leftward and upward from the origin points thereof, respectively, wherein FIGS. 15A(1) through 15A(5) are front elevational views of the image shake correcting apparatus, FIGS. 15B(1) through 15B(5) are longitudinal sectional views of the Y-direction moving stage and the third lens group moving ring, showing the positional relationship therebetween, viewed from one side, and FIGS. 15C(1) through 15C(5) are cross sectional views of the Y-direction moving stage and the third lens group moving ring, showing the positional relationship therebetween, viewed from above; and FIGS. 16A(1) through 16A(5), 16B(1) through 16B(5) and 16C(1) through 16C(5) are diagrams illustrating sequential operations of the zoom lens barrel when being fully retracted from a state where the X-direction moving stage and the Y-direction moving stage are eccentrically positioned leftward and downward from the origin points thereof, respectively, wherein FIGS. 16A(1) through 16A(5) are front elevational views of the image shake correcting apparatus, FIGS. 16B(1) through 16B(5) are longitudinal sectional views of the Y-direction moving stage and the third lens group moving ring, showing the positional relationship therebetween, viewed from one side, and FIGS. 16C(1) through 16C(5) are cross sectional views of the Y-direction moving stage and the third lens group moving ring, showing the positional relationship therebetween, viewed from above.

DESCRIPTION OF THE EMBODIMENT

[Overall Structure of a Zoom Lens Having an Embodiment of a Flexible Wiring Board Mounting Structure of an Image Shake Correcting Apparatus]

Figure 1:
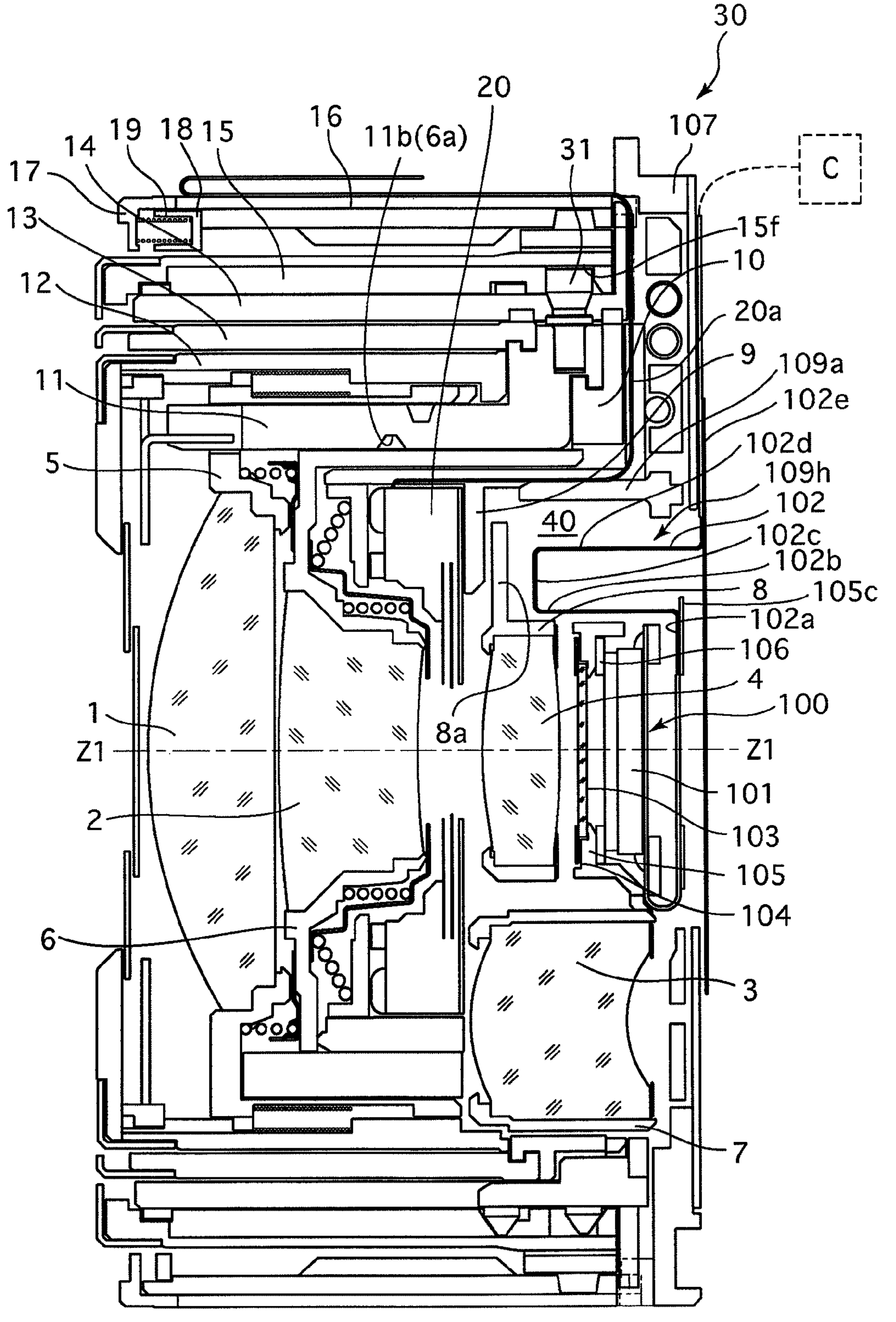
FIG. 1 is a longitudinal sectional view of an embodiment of a zoom lens barrel having a flexible wring board mounting structure of an image shake correcting apparatus according to the present invention, showing the zoom lens barrel in the retracted state (fully-retracted state)
Figure 2:
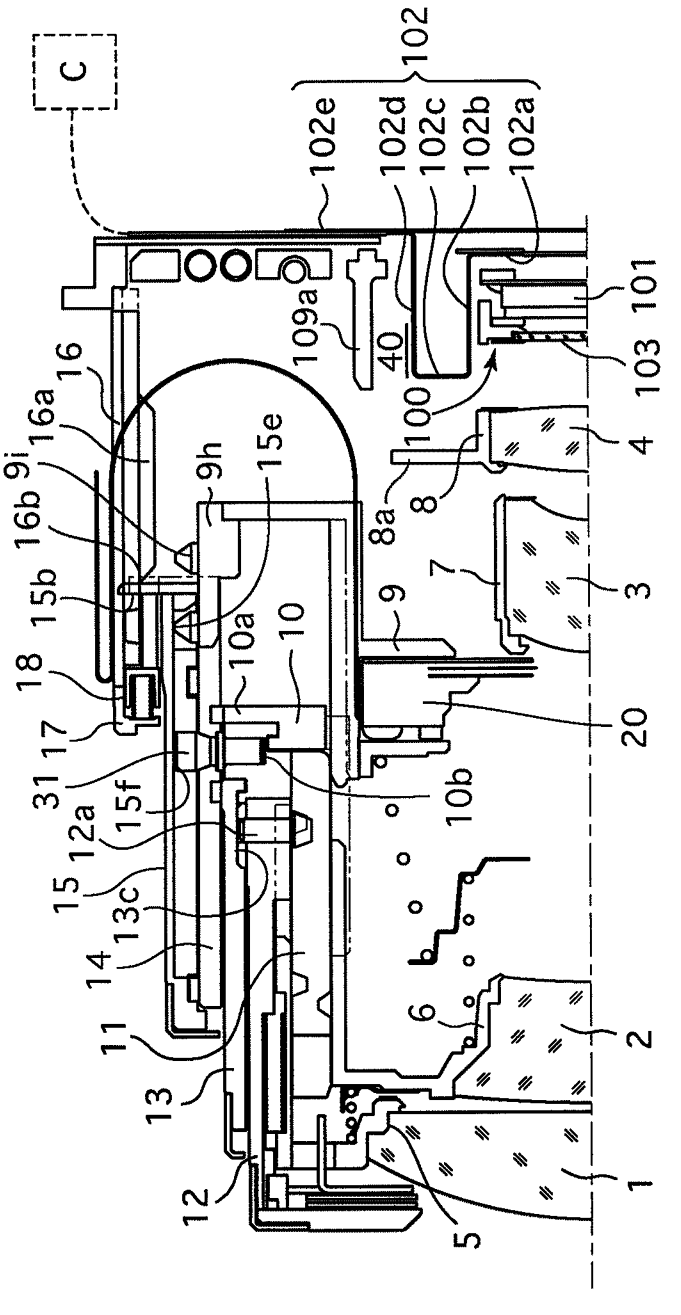
FIG. 2 is a longitudinal sectional view of the zoom lens barrel set at the wide-angle (short-focal-length) extremity in a ready-to-photograph state, showing only an upper half of the zoom lens barrel from a photographing optical axis.
Figure 3:
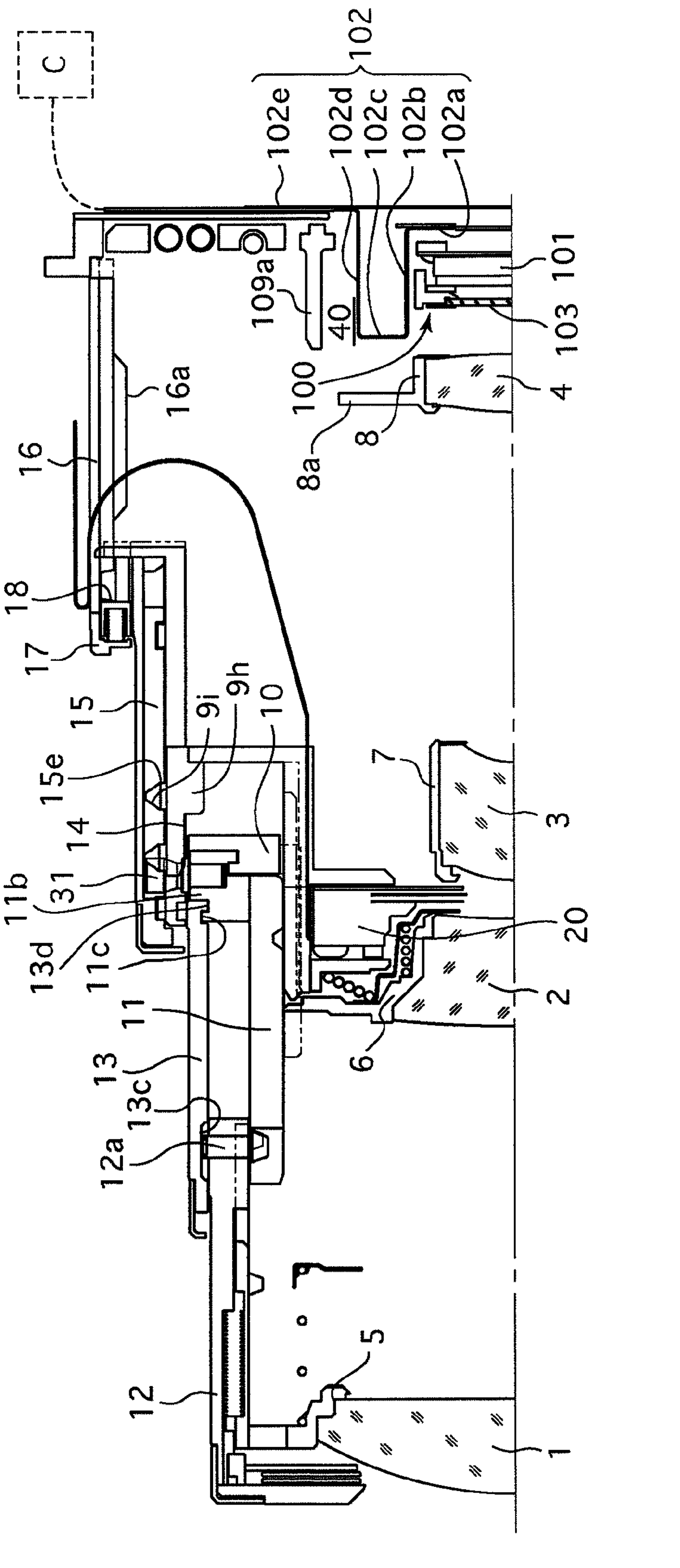
FIG. 3 is a longitudinal sectional view of the zoom lens barrel set at the telephoto (long-focal-length) extremity in a ready-to-photograph, showing only an upper half of the zoom lens barrel from the photographing optical axis.

A zoom lens (zoom lens barrel/retractable zoom lens) 30, having a flexible wiring board mounting structure according to the present invention, is of a type which is incorporated in a compact digital camera. The zoom lens 30 is provided with a photographing optical system which includes a first lens group 1, a second lens group 2, a shutter unit 20, a third lens group (optical element) 3, a fourth lens group (AF lens group) 4, a low-pass filter (infrared cut filter) 103 and a CCD or CMOS type image sensor (image pickup device/image-stabilizing element) 101 (which will be referred simply as image sensor in the following descriptions), in that order from the object side in a ready-to-photograph state as shown in FIGS. 2 and 3. In the zoom lens 30, a plurality of concentrically-arranged movable barrels (cylindrical members) are telescopically extended toward the object side from the retracted state (fully-retracted state) of the zoom lens 30 (shown in FIG. 1) as shown in FIGS. 2 and 3 when the zoom lens 30 is in a ready-to-photograph state, and the movable barrels are fully retracted as shown in FIG. 1 when the camera is not in use. In a ready-to-photograph state of the zoom lens 30, the center axis/optical axis of each optical element from the first lens group 1 through the image sensor 101 is in common with a photographing optical axis Z1 of the photographing optical system.

A zooming operation is carried out by moving the first lens group 1, the second lens group 2 and the third lens group 3 along the photographing optical axis Z1 in a predetermined moving manner, and a focusing operation is carried out by moving the fourth lens group 4 along the photographing optical axis Z1.

In the following descriptions, the term "optical axis direction" means a direction on or parallel to the photographing optical axis Z1. In addition, the object side corresponds to the front side (left side with respect to FIGS. 1 through 3) of the zoom lens 30, and the opposite side or the image-plane side (right side with respect to FIGS. 1 through 3) corresponds to the rear side of the zoom lens 30. Additionally, in a state where the camera is in a normal position (normal horizontal position), the vertical direction in a plane orthogonal to the photographing optical axis Z1 is designated as the Y-axis direction, and the horizontal direction in the same plane is designated as the X-axis direction. The Y-axis direction and the X-axis direction constitute two directions which are orthogonal to each other. Additionally, "circumferential direction" or "rotational direction" refers to a direction about the axis (substantially corresponding to the photographing optical axis X) of an annular member of the zoom lens 10.

The zoom lens 30 is provided on the radially outermost side thereof with a stationary barrel 16, and is provided immediately behind the stationary barrel 16 with an image shake correcting apparatus (image shake correcting unit) 100 (see FIGS. 6 and 7) fixed to the back of the stationary barrel 16. The image sensor 101 is held by the image shake correcting apparatus 100 in a manner of being movable in a plane orthogonal to the photographing optical axis Z1. The image shake correcting apparatus 100 will be discussed in detail hereinafter.

The image sensor 101 is fixedly fitted into a rectangular-box-shaped image sensor holder 105 from behind via an annular sealing member 106. The low-pass filter 103 is fixed to the front of the image sensor holder 105 while being pressed against the image sensor holder 105 by a filter retaining plate 104 which is engaged with the front of the image sensor holder 105. A control circuit C is electrically connected to the image sensor 101 via a flexible PWB (Printed Wiring Board) (FPC board) 102. The flexible PWB 102 is provided with an image sensor connecting portion (inner side connecting portion) 102*a* which is connected to the image sensor 101, and a control circuit connecting portion (outer side connecting portion) 102*e* which is connected to the control circuit. The image sensor connecting portion 102*a* is connected to a terminal formed on a back surface of the image sensor 101, and is folded back upwardly in the vicinity of the lower end of the image sensor 101 and subsequently part of the image sensor connecting portion 102*a* is held by a flexible-PWB holding plate 105*c* (see FIG. 1) fixed to the image sensor holder 105. The flexible PWB 102 is provided between the image sensor connecting portion 102*a* and the control circuit connecting portion 102*e* with a first jutting portion (flexible portion) 102*b* which is bent at a substantially right angle at the upper end of the image sensor connecting portion 102*a* to extend forward in the optical axis direction, and a second jutting portion (flexible portion) 102*d* which is folded back radially outwards at the front end of the image sensor connecting portion 102*a* in the optical axis direction to extend rearward in the optical axis direction in parallel with the first jutting portion 102*b* at a position farther from the photographing optical axis Z1 than the first jutting portion 102*b*. The control circuit connecting portion 102*e* is continuous with the rear end of the second jutting portion 102*d* and extends in a direction orthogonal to the photographing optical axis Z1. In the present embodiment, the first jutting portion 102*b* and the second jutting portion 102*d* are connected and folded at the front ends thereof via a connecting portion (flexible portion) 102*c* which extends in a direction substantially orthogonal to the photographing optical axis Z1. As can be seen in FIG. 1, the first jutting portion (flexible portion) 102*b*, the connecting portion (flexible portion) 102*c*, and a second jutting portion (flexible portion) 102*d* are in the shape of a substantially letter U in cross section. A driving circuit (not shown) for making the image sensor 101 perform an image capturing operation, an image processing circuit (not shown) for processing an image signal that the image sensor 101 outputs upon capturing an object image are connected to the control circuit connecting portion 102*e*.

The image sensor 101 is mounted to the image shake correcting apparatus (image shake correcting unit) 100. The image shake correcting apparatus 100 is provided with a stationary holder (support base) 107, an X-direction moving stage 115 and a Y-direction moving stage 109. The stationary holder 107 is in the shape of a substantially annular frame and fixed to the back of the stationary barrel 16 of the zoom lens 30. The X-direction moving stage 115 is supported by the stationary holder 107 to be freely movable in the X-axis direction relative to the stationary holder 107. The Y-direction moving stage 109 is supported by the X-direction moving stage 115 to be freely movable in the Y-axis direction relative to the X-direction moving stage 115 and to move with the X-direction moving stage 115 in the X-axis direction. The image sensor 101 is mounted to the Y-direction moving stage 109 via the image sensor holder 105. A protective metal plate 108 is fixed to the back of the stationary holder 107.

[Structure of the Zoom Lens]

The structure of the zoom lens 30, which is equipped with the image shake correcting apparatus 100, will be discussed hereinafter. The zoom lens 30 is provided on the radially outermost side thereof with the aforementioned stationary barrel (stationary ring/reference barrel/ring member) 16 that is fixed to a camera body (not shown) equipped with the zoom lens 30, and the image shake correcting apparatus 100, to which the image sensor 101 is mounted, is fixed to the rear end of the stationary barrel 16. A plurality of barrels (ring members) that support lens groups (details of which will be discussed later), e.g., a middle external barrel 13 and a third lens group moving ring (third-lens-group support ring/moving member/ring member) 9, are provided in the stationary barrel 16. The image shake correcting apparatus 100 drives the image sensor 101 to move in two orthogonal directions (X-axis direction and Y-axis direction) along a plane orthogonal to the photographing optical axis Z1 so as to cancel out image shake of an object image captured by the image sensor 101, and this control is performed by the aforementioned controller (not shown) that is provided in the camera body to which the zoom lens 30 is mounted. The image shake correcting apparatus 100 will be discussed in detail later.

Figure 4:
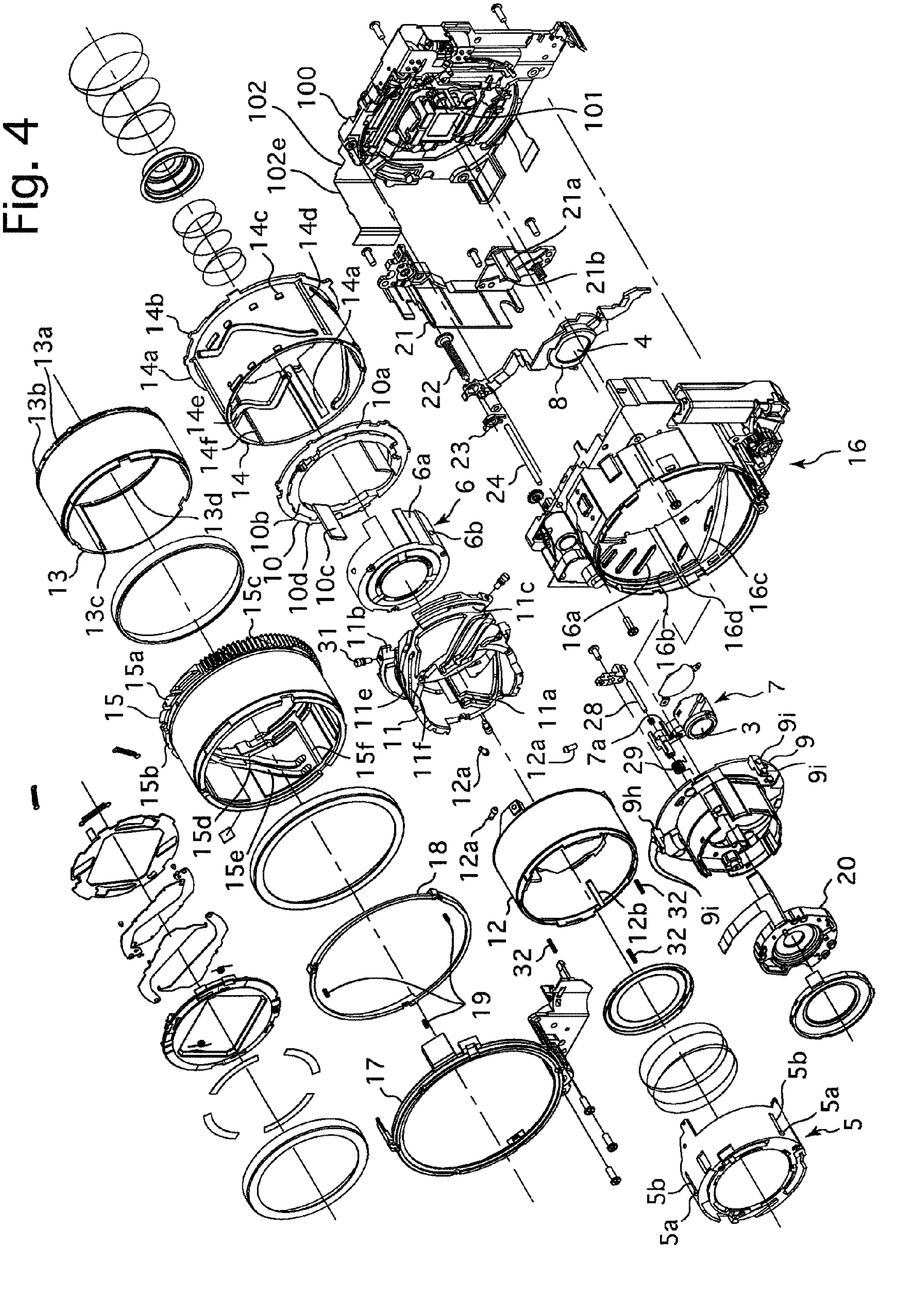
FIG. 4 is an exploded perspective view of some of the elements of the zoom lens barrel.
Figure 5:
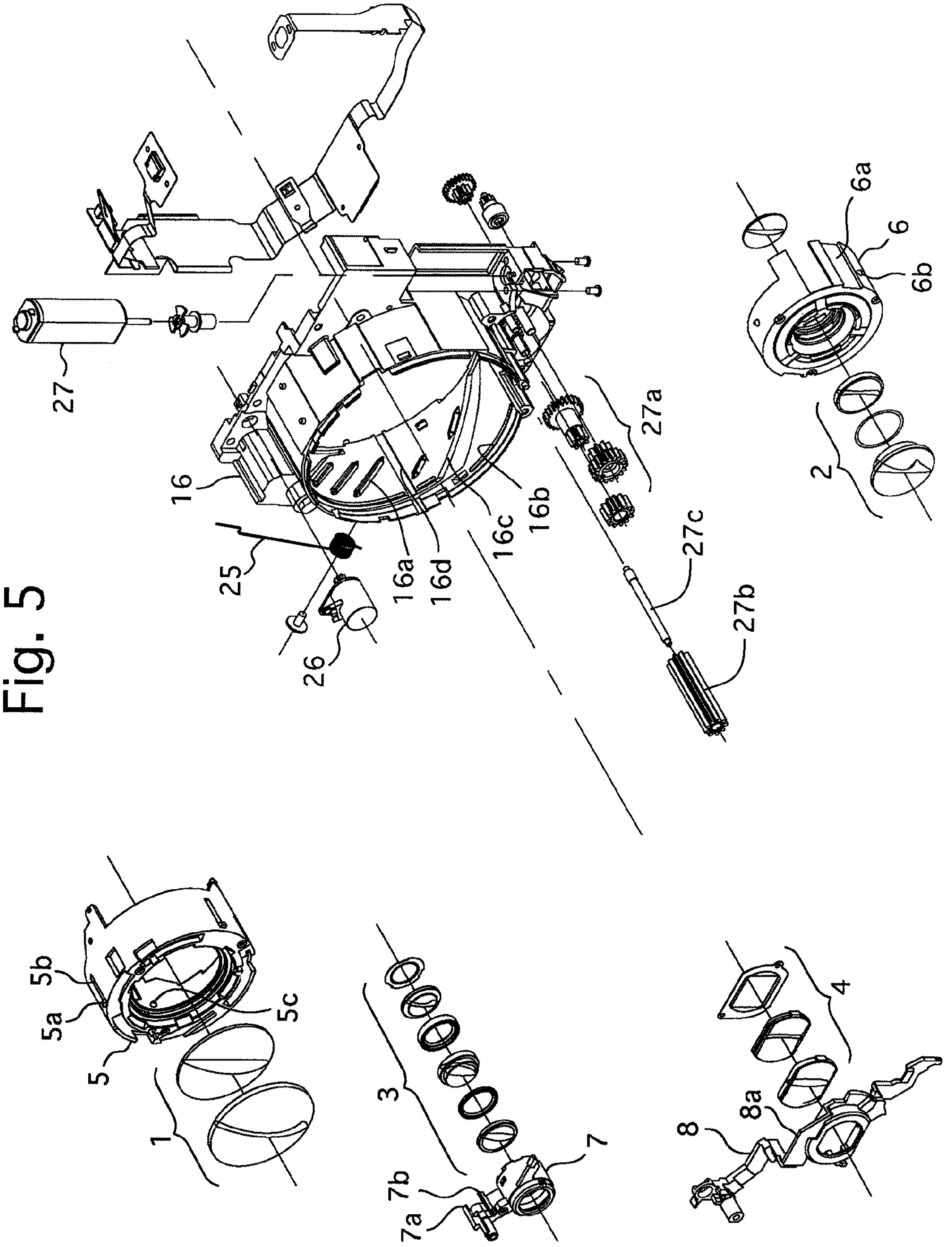
FIG. 5 is an exploded perspective view of some of the elements of zoom lens barrel.

As shown in FIGS. 4 and 5, the zoom lens 30 is provided at the front end of the stationary barrel 16 with a support ring 17 which is fixed to the front end of the stationary barrel 16 via a biasing ring 18. The support ring 17 is biased forward in the optical axis direction by three compression coil springs 19 (see FIG. 4) which are inserted in between the support ring 17 and the biasing ring 18 at substantially equi-angular intervals about the photographing optical axis O.

The zoom lens 30 is provided in the stationary barrel 16 with an AF lens group frame (lens support frame) 8 which holds the fourth lens group 4. The AF lens group frame 8 is supported by an AF guide shaft 24 to be freely movable linearly in the optical axis direction, and is linked with a lead screw 22 while being prevented from rotating. The AF lens group frame 8 is biased forward in the optical axis direction by a fourth-lens-group biasing spring 25 in the form of a torsion spring.

The fourth lens group 4 is supported by the AF lens group frame 8, having a flange 8*a* that outwardly and radially extends in a direction orthogonal to the optical axis Z1. Furthermore, the fourth lens group 4 is provided closest to the image sensor 101 out of all the other lens groups provided in front of the image sensor 101.

An AF nut 23 is screw-engaged with the lead screw 22 with being prevented from rotating. The AF lens group frame 8 is biased forward in the optical axis direction by the fourth-lens-group biasing spring 25 to abut against the AF nut 23 from behind. The lead screw 22 is driven to rotate by an AF motor 26 which is supported by the stationary barrel 16. Accordingly, rotating the lead screw 22 forward and reverse by the AF motor 26 causes the AF nut 23 to move forward and rearward along the lead screw 22 without rotating with the lead screw 22, thus causing the position of the AF lens group frame 8 to vary in accordance with the forward/rearward movement of the AF nut 23.

The zoom lens 30 is provided with a zoom motor 27 which is fixed to a side of the stationary barrel 16 to be supported thereby (see FIG. 5). The driving force of the zoom motor 27 is transmitted to a zoom gear 27*b* via a reduction gear train 27*a*. The zoom gear 27*b* is rotatably fitted on a shaft 27*c* (see FIG. 5) which is fixed to the stationary barrel 16 to extend parallel to the photographing optical axis Z1. The zoom gear 27*b* is in mesh with an outer circumferential gear 15*c* formed on an outer peripheral surface of a helicoid ring (first barrel/ring member) 15 (see FIG. 4).

The stationary barrel 16 is provided on an inner peripheral surface thereof with an inner helicoid (helicoidal threads) 16*a* and a set of small-lead (small lead angle) grooves 16*b* positioned in front of the inner helicoid 16*a*. The set of small-lead grooves 16*b* are formed substantially as a discontinuous ring-shaped groove about the photographing optical axis O, and the lead angle of each small-lead groove 16*b* is extremely small compared with that of the inner helicoid 16*a*. The helicoid ring 15 is provided on an outer peripheral surface thereof with an outer helicoid 15*a* which is engaged with the inner helicoid 16*a* of the stationary barrel 16. Due to the lead of the outer helicoid 15*a* and the inner helicoid 16*a*, the helicoid ring 15 moves in the optical axis direction while rotating.

Upon the helicoid ring 15 advancing to a predetermined forward position (wide-angle extremity position), a set of guide projections 15*b* formed on an outer peripheral surface of the helicoid ring 15 enter the set of small-lead grooves 16*b*, respectively, so that the helicoid ring 15 slightly moves in the optical axis direction while rotating relative to the stationary barrel 16 when the helicoid ring 15 is rotated.

The stationary barrel 16 is further provided on an inner peripheral surface thereof with a set of lead grooves 16*c* which are communicatively connected at the front ends thereof to the set of small-lead grooves 16*b*, respectively, and which extend parallel to threads of the inner helicoid 16*a*. The set of guide projections 15*b* of the helicoid ring 15 remain engaged in the set of lead grooves 16*c*, respectively, during the time the inner helicoid 16*a* and the outer helicoid 15*a* are engaged with each other. Both sides of each guide projection 15*b* in the circumferential direction of the helicoid ring 15 are formed as a pair of inclined surfaces parallel to the associated lead groove 16*c*, and each guide projection 15*b* is movable along the associated lead groove 16*c* with the pair of inclined surfaces being in sliding contact with the pair of opposed side walls of the associated lead groove 16*c*, respectively. On the other hand, each of the front and rear surfaces of each guide projection 15*b* in the optical axis direction is formed as a flat surface slightly inclined to a plane orthogonal to the photographing optical axis Z1. Each guide projection 15*b* moves in the optical axis direction with a small lead pitch with the front and rear circumferential flat surfaces of each guide projection 15*b* being in sliding contact with the opposed side walls (front and rear side walls) of the associated small-lead groove 16*b*, respectively, when the set of guide projections 15*b* are positioned in the set of small-lead grooves 16*b*, respectively.

The zoom lens 30 is provided with a first linear guide ring (ring member) 14 which is positioned inside the helicoid ring 15 and supported thereby. The first linear guide ring 14 is provided with an annular flange 14*a* which projects radially outwards from the rear end of the first linear guide ring 14, and is provided on the annular flange 14*a* with a plurality of linear guide projections 14*b*which project radially outward from the annular flange 14*a*. The first linear guide ring 14 is guided linearly in the optical axis direction relative to the stationary barrel 16 via the engagement of the plurality of linear guide projections 14*b* with a plurality of linear guide grooves 16*d* (only one of which appears in FIG. 4).

In addition, the first linear guide ring 14 is provided on an outer peripheral surface thereof with a plurality of rotational guide projections 14*c*, and the helicoid ring 15 is provided on an inner peripheral surface thereof with a circumferential groove 15*d* in which the plurality of rotational guide projections 14$c$ are engaged. Additionally, the annular flange 14$a$ is in contact with the rear end surface of the helicoid ring 15 to be slidable thereon. Accordingly, due to the engagement of the plurality of rotational guide projections 14$c$ with the circumferential groove 15$d$ and the engagement of the annular flange 14$a$ with the rear end surface of the helicoid ring 15, the first linear guide ring 14 and the helicoid ring 15 are coupled to each other to be integrally movable in the optical axis direction while allowing rotation of the helicoid ring 15 relative to the first linear guide ring 14.

The first linear guide ring 14 is provided with a set of linear guide slots (through-slots) 14$d$ which extend parallel to the photographing optical axis Z1. The zoom lens 30 is provided inside the helicoid ring 15 with the third lens group moving ring 9. The third lens group moving ring 9 constitutes an innermost ring member of the zoom lens 30. The third lens group moving ring 9 is guided linearly in the optical axis direction due to the engagement of a set of linear guide keys 9$h$ which radially project from the third lens group moving ring 9 with the set of linear guide slots 14$d$ of the first linear guide ring 14. Each linear guide slot 14$d$ is formed through the first linear guide ring 14 in a radial direction, and the third lens group moving ring 9 is provided with a plurality of third-lens-group-control cam followers 9$i$ which are formed on the linear guide keys 9$h$ to project radially outwards from the set of linear guide slots 14$d$, respectively. The plurality of third-lens-group-control cam followers 9$i$ are engaged in a corresponding plurality of third-lens-group guide cam grooves 15$e$ formed on an inner peripheral surface of the helicoid ring 15, respectively. The plurality of third-lens-group-control cam followers 9$i$ and the plurality of third-lens-group guide cam grooves 15$e$ are used for moving the third lens group 3 in the optical axis direction. Each third-lens-group guide cam groove 15$e$ is provided with a movement-control groove portion and a circumferential groove portion. The movement-control groove portion of each third-lens-group guide cam groove 15$e$ is inclined to a plane orthogonal to the photographing optical axis Z1 at a predetermined angle of inclination, and the circumferential groove portion of each third-lens-group guide cam groove 15$e$ is communicatively connected to the rear end of the movement-control groove portion of the associated third-lens-group guide cam groove 15$e$, lies in a plane orthogonal to the photographing optical axis Z1 and has no lead angle (i.e., the lead angle is zero). When the plurality of third-lens-group-control cam followers 9$i$ are positioned in the movement-control groove portions of the plurality of third-lens-group guide cam grooves 15$e$, respectively, a rotation of the helicoid ring 15 causes the third lens group moving ring 9, which is guided linearly by the first linear guide ring 14, to move in the optical axis direction relative to the helicoid ring 15 and the first linear guide ring 14 in accordance with the contours of the movement-control groove portions of the plurality of third-lens-group guide cam grooves 15$e$.

On the other hand, when the plurality of third-lens-group-control cam followers 9$i$ are positioned in the circumferential groove portions of the plurality of third-lens-group guide cam grooves 15$e$, respectively, a rotation of the helicoid ring 15 causes the third lens group moving ring 9 to move in the optical axis direction together with a linear movement of the helicoid ring 15 in the optical axis direction. The plurality of third-lens-group guide cam grooves 15$e$ are provided as three pairs of cam grooves 15$e$ at three different positions in the circumferential direction of the helicoid ring 15, and each pair of cam grooves 15$e$ includes a front cam groove 15$e$ and a rear cam groove 15$e$ positioned behind the front cam groove 15$e$ in the optical axis direction. In each pair of cam grooves 15$e$, the circumferential groove portion of the rear cam groove 15$e$ is open at the rear end of the helicoid ring 15. To correspond to the plurality of third-lens-group guide cam grooves 15$e$, the plurality of third-lens-group-control cam followers 9$i$ consist of three pairs of cam followers 9$i$ at three different positions in the circumferential direction of the third lens group moving ring 9, and each pair of cam followers 9$i$ consists of a front cam follower 9$i$ and a rear cam follower 9$i$ positioned behind the front cam follower 9$i$ in the optical axis direction.

As shown in FIG. 4, the zoom lens 30 is provided inside the third lens group moving ring 9 with a third lens group frame 7 which is pivoted about a pivot shaft 28 which extends parallel to the photographing optical axis Z1. The third lens group frame 7 holds the third lens group 3, constituting an optical element, at a position eccentric to the pivot shaft 28 with the optical axis of the third lens group 3 extending parallel to the pivot shaft 28. The third lens group frame 7 is rotatable (swingable) about the pivot shaft 28 between an on-axis position (shown in FIGS. 2 and 3), at which the optical axis (center) of the third lens group 3 coincides with the photographing optical axis Z1, and an off-axis displaced position (radially retracted away from the photographing optical axis Z1) (shown in FIG. 1) at which the optical axis of the third lens group 3 is eccentrically positioned with respect to the photographing optical axis Z1. The third lens group frame 7 is biased to rotate in a direction toward the on-axis position by a torsion spring 29 to be held in the on-axis position.

On the other hand, a rearward movement of the third lens group moving ring 9 in the optical axis direction causes the third lens group frame 7 to come into contact with a cam bar 21$a$ which projects from a displacing cam plate 21 fixed to the stationary barrel 16, and a further rearward movement of the third lens group moving ring 9 in the optical axis direction causes the third lens group frame 7 to rotate to the radially retracted position (off-axis displaced position) against the biasing force of the torsion spring 29. More specifically, a cam surface 21$b$ having a predetermined degree of inclination relative to the optical axis direction is formed on a front end surface of the cam bar 21$a$, and a cam surface 7$a$ is formed on the third lens group frame 7 so as to face the cam surface 21$b$ when the third lens group frame 7 that holds the third lens group 3 is in the on-axis position. Upon the third lens group moving ring 9 approaching the image shake correcting apparatus 100 while moving rearward, the cam surface 7$a$ of the third lens group frame 7 comes into contact with the cam surface 21$b$, and a further rearward movement of the third lens group moving ring 9 causes a component force which rotates the third lens group frame 7 to be produced from the rearward moving force in the optical axis direction, thus rotating the third lens group frame 7 along the cam surfaces 7$a$ and 21$b$ to displace the third lens group frame 7 (the third lens group 3) to the radially retracted position (off-axis displaced position).

The third lens group frame 7 (the third lens group 3) having been rotated to the off-axis displaced position is accommodated in a lower position where neither the third lens group frame 7 nor the third lens group 3 interferes with either the fourth lens group 4 or the image sensor 101. In addition, the zoom lens 30 is provided inside the third lens group moving ring 9 with a shutter unit 20 which is fixed to the third lens group moving ring 9 to be positioned in front of the third lens group frame 7. Although not shown in the drawings, a shutter and an adjustable diaphragm are incorporated in the shutter unit 20.

The first linear guide ring 14 is provided with a set of roller-guiding cam slots 14e which are formed through inner and outer peripheral surfaces of the first linear guide ring 14. The zoom lens 30 is provided radially inside the first linear guide ring 14 with a cam ring (ring member) 11 rotatable about the optical axis Z1. A set of guide rollers (followers) 31 fixed to the cam ring 11 at different circumferential positions thereon to project radially outwards are slidably engaged in the set of roller-guiding cam slots 14*e*, respectively. The set of guide rollers 31 extend radially outwards through the set of roller-guiding cam slots 14*e* to be engaged in a set of roller-engaging grooves 15*f* which are formed on an inner peripheral surface of the helicoid ring 15, respectively. Each roller-engaging groove 15*f* is provided with a rotational transfer groove portion and a circumferential groove portion. The rotational transfer groove portion extends parallel to the photographing optical axis Z1, while the circumferential groove portion is communicatively connected to the rear end of the rotational transfer groove portion of the associated roller-engaging groove, lies in a plane orthogonal to the photographing optical axis Z1 and does not have axial-direction component (i.e., the lead angle is zero). When the set of guide rollers 31 are positioned in the rotational transfer groove portions of the set of roller-engaging grooves 15*f*, respectively, a rotational force of the helicoid ring 15 is transferred to the set of guide rollers 31 via wall surfaces of the rotational transfer groove portion of each roller-engaging groove 15*f* when the helicoid ring 15 is rotated, and accordingly, the cam ring 11 rotates integrally with the helicoid ring 15 when the helicoid ring 15 is rotated. This rotation of the cam ring 11 causes the cam ring 11 to move in the optical axis direction while rotating relative to the helicoid ring 15 and the first linear guide ring 14 in accordance with the contours of the set of roller-guiding cam slots 14*e*, in which the set of guide rollers 31 are engaged, respectively. On the other hand, when the set of guide rollers 31 are positioned in the circumferential groove portions of the set of roller-engaging grooves 15*f*, respectively, a rotation of the helicoid 15 causes each guide roller 31 to move in the circumferential groove portion of the associated roller-engaging groove 15*f*, thus causing the cam ring 11 to move with the helicoid ring 15 in the optical axis direction though no rotational force of the helicoid ring 15 is transferred to the cam ring 11.

The zoom lens 30 operates in a manner which will be discussed hereinafter when the zoom motor 27 rotates. Driving the zoommotor 27 to rotate in a lens barrel advancing direction causes the helicoid ring 15 to advance while rotating due to the engagement of the inner helicoid 16*a*with the outer helicoid 15*a*. This advancing and rotating movement of the helicoid ring 15 causes the first linear guide ring 14 to move linearly forward with the helicoid ring 15. Upon the helicoid ring 15 and the first linear guide ring 14 being advanced by a predetermined amount of movement, the outer helicoid 15*a* and the inner helicoid 16*a* are disengaged from each other, and the set of guide projections 15*b* of the helicoid ring 15 are engaged in the set of small-lead grooves 16*b* of the stationary barrel 16, respectively, so that the helicoid 15 comes to move in the optical axis direction with a small lead pitch while rotating relative to the stationary barrel 16. With this movement of the helicoid 15, the first linear guide ring 14 also moves in the optical axis direction with a small lead pitch from the position where the first linear guide ring 14 is advanced forward in the optical axis direction.

The position of the third lens group moving ring 9 in the optical axis direction, which is guided linearly by the first linear guide ring 14, is controlled by the plurality of third-lens-group guide cam grooves 15*e* of the helicoid ring 15. Namely, when the plurality of third-lens-group-control cam followers 9*i* are positioned in the circumferential groove portions of the plurality of third-lens-group guide cam grooves 15*e*, respectively, the relative position between the helicoid ring 15 and the third lens group moving ring 9 in the optical axis direction does not vary; however, the position of the third lens group moving ring 9 in the optical axis direction relative to the image shake correcting apparatus 100 varies in accordance with variations in position of the helicoid ring 15 that is advanced due to the engagement between the outer helicoid 15*a* and the inner helicoid 16*a*. In addition, once the plurality of third-lens-group-control cam followers 9*i* enter the movement-control groove portions of the plurality of third-lens-group guide cam grooves 15*e*, respectively, a rotation of the helicoid ring 15 causes the third lens group moving ring 9 to move relative to the helicoid ring 15 in the optical axis direction in accordance with the lead of the movement-control groove portions of the plurality of third-lens-group guide cam grooves 15*e*.

The position of the cam ring 11 in the optical axis direction is controlled by the engagement of the set of roller-guiding cam slots 14*e* of the first linear guide ring 14 with the set of roller-engaging grooves 15*f* that are formed on an inner peripheral surf ace of the helicoid ring 15. Namely, when the set of guide rollers 31 are positioned in the circumferential groove portions of the set of roller-engaging grooves 15*f*, respectively, each guide roller 31 moves in the circumferential groove portion of the associated roller-engaging groove 15*f*, so that the cam ring 11 moves with the helicoid ring 15 in the optical axis direction without following the rotation of the helicoid ring 15. Namely, the position of the cam ring 11 relative to the image shake correcting apparatus 100 in the optical axis direction varies in accordance with variations in position of the helicoid ring 15 that is advanced due to the engagement between the outer helicoid 15*a* and the inner helicoid 16*a*. In addition, upon the set of guide rollers 31 entering the rotational transfer groove portions of the set of roller-engaging grooves 15*f*, respectively, a rotation of the helicoid ring 15 causes the cam ring 11 to rotate with the helicoid ring 15, thus causing the cam ring 11 to move in the optical axis direction while rotating relative to the first linear guide ring 14 in accordance with the contours of the set of roller-guiding cam slots 14*e*.

As shown in FIG. 4, the linear guide ring 14 is provided on an inner peripheral surface thereof with a plurality of linear guide grooves (bottomed grooves) 14*f* which extend parallel to the photographing optical axis Z1, independently of the set of linear guide slots 14*d* that are used for guiding the third lens group moving ring 9 linearly in the optical axis direction. The zoom lens 30 is provided inside the first linear guide ring 14 with a second linear guide ring 10 and the aforementioned middle external barrel (second barrel/ring member) 13, each of which is guided linearly in the optical axis direction by the plurality of linear guide grooves 14*f*. The middle external barrel 13 advances from and retracts into the helicoid ring 15.

The second linear guide ring 10 is provided with a rear end flange 10*a*, a small-diameter flange 10*b* and a pair of guide keys 10*c*. The rear end flange 10*a* is formed in a plane substantially orthogonal to the photographing optical axis Z1, the small-diameter flange 10*b* is positioned in front of the rear end flange 10*a* with a predetermined spacing (distance) therebetween, and the pair of guide keys 10*c* project forward from the position of the small-diameter flange 10*b*, extending parallel to the photographing optical axis Z1. The rear end flange 10*a* is provided with a plurality of linear guide projections 10*d* which project radially outwards. The second linear guide ring 10 is guided linearly in the optical axis direction by making the plurality of linear guide projections 10*d* engaged in the plurality of linear guide grooves 14*f* to be slidingly movable therein in the optical axis direction. The cam ring 11 is provided at the rear end thereof with a plurality of rotation guide projections (not shown) which project radially inwards and are engaged in between the rear end flange 10*a* and the small-diameter flange portion 10*b* in a manner to be prevented from moving in the optical axis direction relative to the second linear guide ring 10 and to be allowed to rotate relative to the second linear guide ring 10. Due to this engagement, the cam ring 11 and the second linear guide ring 10 are coupled to each other to be rotatable relative to each other and to be movable together in the optical axis direction.

The zoom lens 30 is provided inside the cam ring 11 with a second lens group frame 6 which holds the second lens group 2. The pair of guide keys 10*c* of the second linear guide ring 10 are engaged in a pair of linear grooves 6*a*, respectively, which are formed on the second lens group frame 6 to extend parallel to the photographing optical axis Z1. Due to the engagement of the pair of guide keys 10*c* with the pair of linear grooves 6*a*, the second lens group frame 6 is guided linearly in the optical axis direction. The second lens group frame 6 is provided on an outer peripheral surface thereof with second-lens-group-control cam followers 6*b* which are respectively engaged in second-lens-group guide cam grooves 11*a* formed on an inner peripheral surface of the cam ring 11. A rotation of the cam ring 11 causes the second lens group frame 6 to move in the optical axis direction due to the engagement of the second-lens-group guide cam grooves 11*a* with the second-lens-group-control cam followers 6*b*.

The middle external barrel 13 is provided, on an outer peripheral surface thereof in the vicinity of the rear end of the middle external barrel 13, with an annular flange 13*a*, and is provided on the annular flange 13*a* with a plurality of linear guide projections 13*b* which are slidably engaged in the plurality of linear guide grooves 14*f* of the first linear guide ring 14, respectively. The middle external barrel 13 is guided linearly in the optical axis direction due to the engagement of the plurality of linear guide projections 13*b* with the plurality of linear guide grooves 14*f*. The middle external barrel 13 is provided on an inner peripheral surface thereof with linear guide grooves 13*c* which extend parallel to the photographing optical axis Z1, and is provided at the rear end of the inner peripheral surface of the middle external barrel 13 with a plurality of rotation guide projections 13*d* which project radially inwards. The cam ring 11 is provided, on an outer peripheral surface thereof in the vicinity of the rear end of the cam ring 11, with a rear end flange 11*b* which projects radially outwards and a small-diameter flange 11*c* positioned in front of the rear end flange 11*b* with a predetermined spacing provided therebetween. The radially inner ends (fixed ends) of the guide rollers 31 are embedded into the rear end flange 11*b*. The plurality of rotation guide projections 13*d* of the middle external barrel 13 are engaged in between the rear end flange 11*b* and the small-diameter flange 11*c* in a manner to be prevented the middle external barrel 13 from moving in the optical axis direction relative to the cam ring 11 and to allow the middle external barrel 13 to rotate relative to the cam ring 11. Due to this engagement, the cam ring 11 and the middle external barrel 13 are coupled to each other to be rotatable relative to each other and to be movable together in the optical axis direction. The zoom lens 30 is provided immediately inside the middle external barrel 13 with a frontmost external barrel (third barrel/ring member) 12 which advances from and retracts into the middle external barrel 13. The frontmost external barrel 12 is provided on an outer peripheral surface thereof with followers 12*a* which are engaged in the linear guide grooves 13*c* of the middle external barrel 13, respectively. The frontmost external barrel 12 is guided linearly in the optical axis direction due to the engagement of the followers 12*a* with the linear guide grooves 13*c*.

The frontmost external barrel 12 is provided on an inner peripheral surface thereof with linear guide grooves 12*b* which are formed so as to extend parallel to the photographing optical axis Z1. The zoom lens 30 is provided inside the frontmost external barrel 12 with a first lens group frame 5 which holds the first lens group 1. The first lens group frame 5 is provided on an outer peripheral surface thereof with guide projections 5*a* which are engaged in the set of linear guide grooves 12*b* to be movable therein in the optical axis direction, respectively. Due to the engagement of the linear guide grooves 12*b* with the guide projections 5*a*, the frontmost external barrel 12 and the first lens group frame 5 are coupled to each other in a manner to be prevented from rotating relative to each other and to be allowed to move relative to each other in the optical axis direction. Namely, the first lens group frame 5 is also guided linearly in the optical axis direction via the frontmost external barrel 12. The first lens group frame 5 is provided on an outer peripheral surface thereof with a set of linear grooves 5*b* which extend rearward from the set of guide projections 5*a*, respectively. The set of linear grooves 5*b* and the set of linear guide grooves 12*b* form spring accommodation spaces in which first lens group biasing springs 32 are accommodated, respectively. Each of the first lens group biasing springs 32 is a compression coil spring. The front and rear ends of each first lens group biasing spring 32 are in contact with the associated guide projection 5*a* and the rear end surface of the associated linear guide groove 12*b*, respectively.

The frontmost external barrel 12 is provided, on an inner peripheral surface thereof in the vicinity of the rear end of the frontmost external barrel 12, with followers 12*a*, the shaft portions of which are press-fitted into fixing holes formed through the frontmost external barrel 12, and the first lens group frame 5 is provided on an inner peripheral surface thereof with a plurality of first-lens-group-control cam followers 5*c* (only one of which is shown in FIG. 5). The followers 12*a* (which project radially inwards) of the frontmost external barrel 12 are slidably engaged in first nonlinear cam grooves 11*e*, respectively, which are formed on an outer peripheral surface of the cam ring 11, while the plurality of first-lens-group-control cam followers 5*c* are slidably engaged in a corresponding plurality of second nonlinear cam grooves 11*f*, respectively, which are formed on an outer peripheral surface of the cam ring 11. A rotation of the cam ring 11 causes the followers 12*a* to move along the first nonlinear cam grooves 11*e* therein while being guided thereby, respectively, thus causing the frontmost external barrel 12 to move in the optical axis direction relative to the cam ring 11. In addition, a rotation of the cam ring 11 causes the plurality of first-lens-group-control cam followers 5*c* of the first lens group frame 5 to move along the plurality of second nonlinear cam grooves 11*f* therein while being guided thereby, respectively, thus causing the first lens group frame 5 to move in the optical axis direction relative to the cam ring 11.

[Description of the Image Shake Correcting Apparatus]

Figure 6:
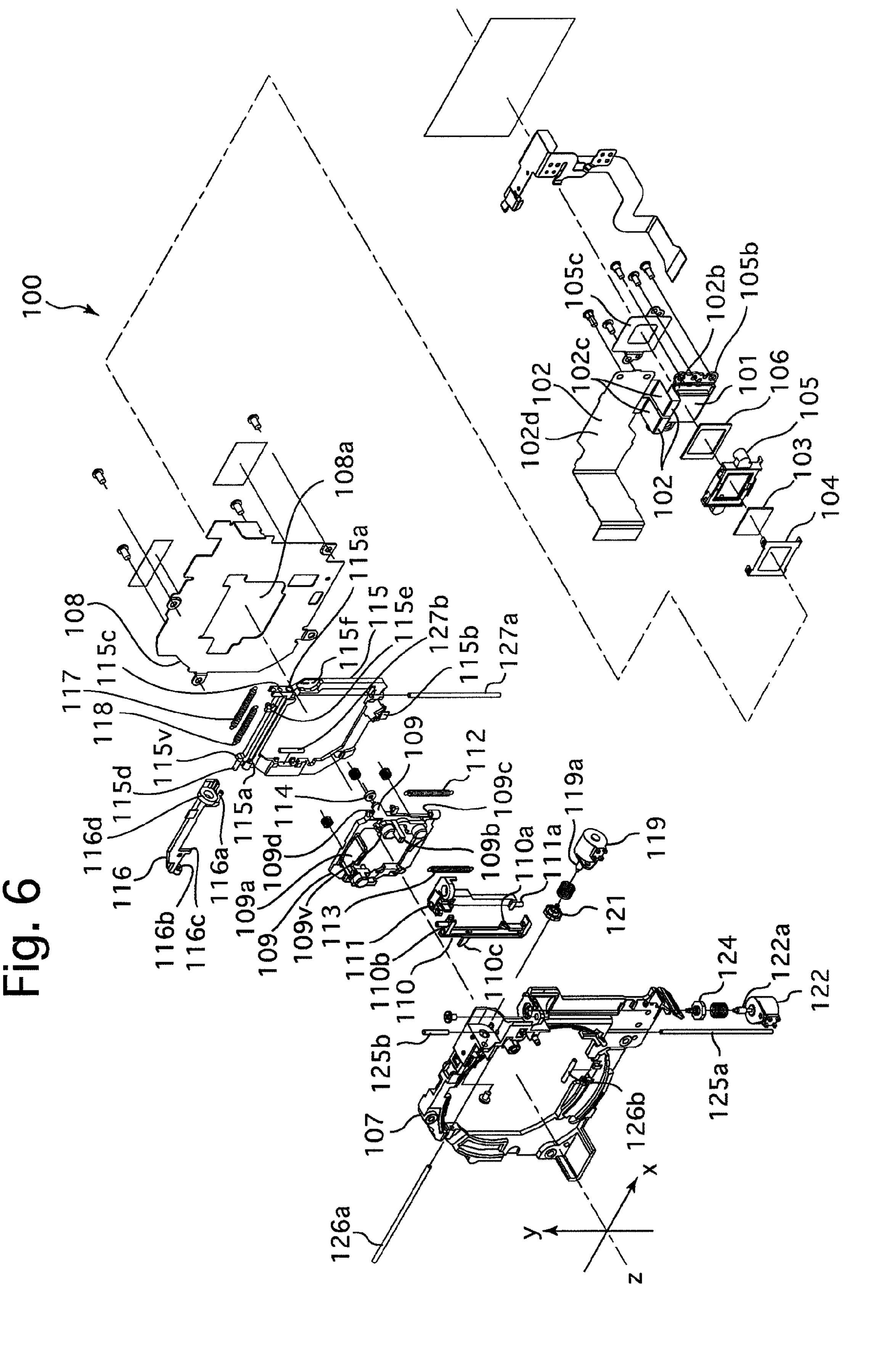
FIG. 6 is an exploded perspective view of an image shake correcting unit to which the flexible wiring board mounting structure according to the present invention has been applied.
Figure 7:
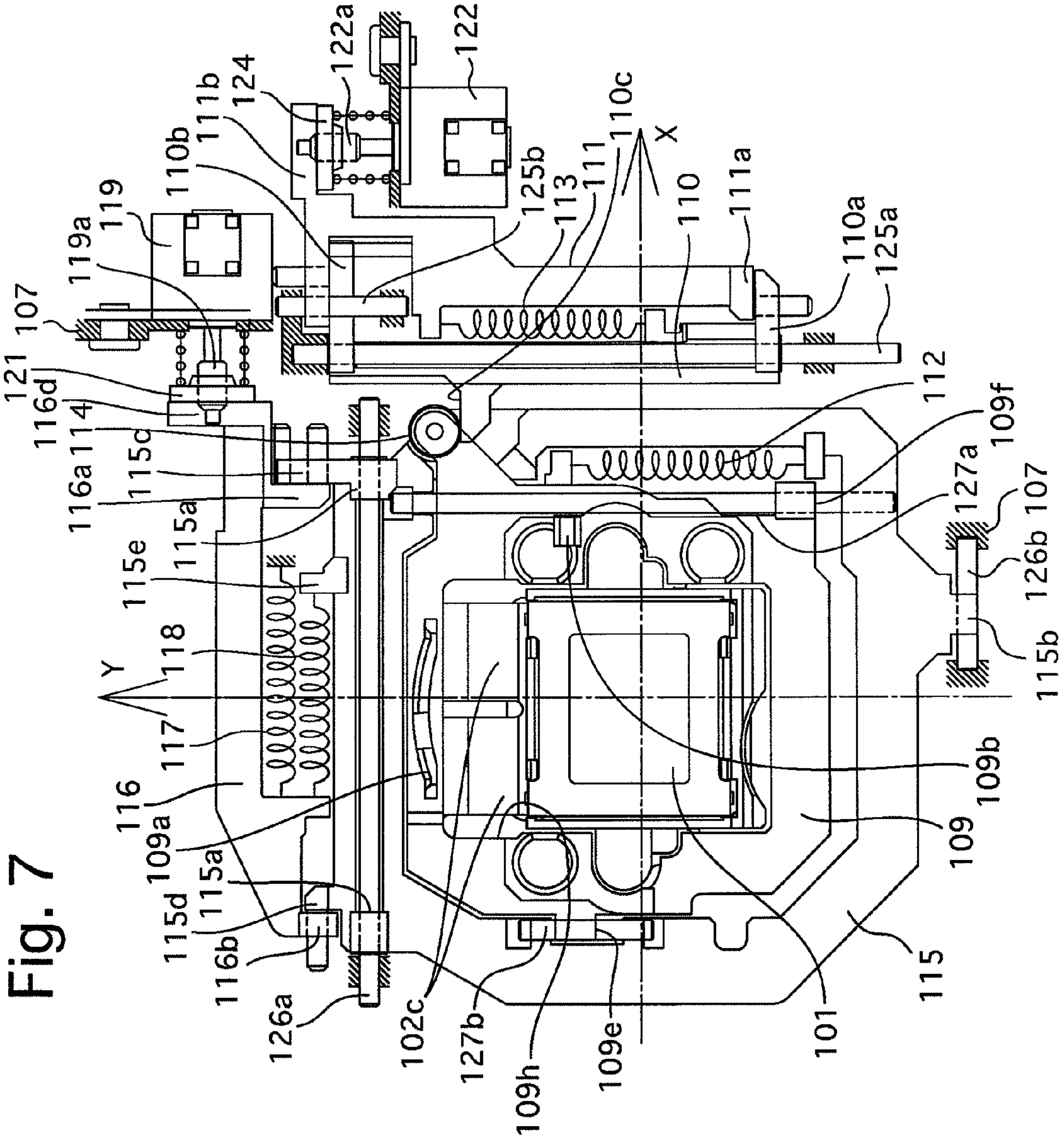
FIG. 7 is a front elevational view of the image shake correcting unit in an assembled state.

The image shake correcting apparatus 100 moves the image sensor 101 in a plane orthogonal to the photographing optical axis Z1 to counteract (stabilize) image shake of an object image formed on the image sensor 101 in accordance with the direction and the magnitude of vibration (hand shake) applied to the digital camera. This control is performed by a control circuit (not shown). FIG. 6 is an exploded perspective view of the image shake correcting apparatus 100 that includes the image sensor 101 and FIG. 7 is a front elevational view of the image shake correcting apparatus 100 in an assembled state.

The Y-direction moving stage 109 and the X-direction moving stage 115 serve as a pair of mutually parallel in-plane moving members which move relative to each other while maintaining a parallel state with each other, and the Y-direction moving stage 109 serves as an in-plane moving member on which an image sensor (101) is mounted. The Y-axis direction and the X-axis direction constitute two directions which are orthogonal to each other.

The stationary holder (support base) 107 is provided on the right edge thereof as viewed from front with a pair of Y-direction guide rods 125*a* and 125*b* which extend in the Y-axis direction (upward/downward direction) (i.e., in a direction parallel to the Y-axis). In addition, the stationary holder (support base) 107 is provided on the upper edge as viewed from the front with a pair of X-direction guide rods 126*a* and 126*b* which extend in the X-axis direction (leftward/rightward direction) (i.e., in a direction parallel to the X-axis).

The X-direction moving stage 115 is provided with a pair of guide holes 115*a* into which the pair of X-direction guide rods 126*a* and 126*b* are inserted, respectively, so that the X-direction moving stage 115 is supported by the pair of X-direction guide rods 126*a* and 126*b* to be freely movable along the X-axis direction.

The image shake correcting apparatus 100 is provided with an X-direction moving member (X-supplemental slider) 116 which is elongated in the X-axis direction and supported by an upper end of the X-direction moving stage 115. The X-direction moving member 116 is provided at one end thereof (right end with respect to FIG. 7) in the X-axis direction with a stop flange 116*a* from which a guide pin projects outwardly (rightward with respect to FIG. 7) in the X-axis direction, and this guide pin is slidably inserted into a guide hole which is formed through a position limit flange 115*c* of the X-direction moving stage 115. The X-direction moving member 116 is provided at another end thereof (left end with respect to FIG. 7) in the X-axis direction with a positioning flange 116*b* having a guide hole into which a guide pin projecting from a positioning flange 115*d* of the X-direction moving stage 115 is slidably engaged. The X-direction moving member 116 is supported by the X-direction moving stage 115 to be freely movable relative thereto in the X-axis direction via the respective engagement between the above-mentioned guide pins and the above-mentioned guide holes.

The image shake correcting apparatus 100 is provided with an X-direction coupling extension spring (X-biasing spring) 117 which is extended and installed between the X-direction moving member 116 and the stationary holder 107. The X-direction coupling extension spring 117 is an extension coil spring and biases the X-direction moving member 116 rightward as viewed from front relative to the stationary holder 107. The X-direction coupling extension spring 117 biases the X-direction moving member 116 in the rightward as viewed from front of the zoom lens 30 (leftward as viewed from rear of the zoom lens 30) to bring a nut contacting portion 116*d* of the X-direction moving member 116 into abutment against an X-direction driven nut member 121. The X-direction driven nut member 121 is screw-engaged with a feed shaft 119*a* of an X-direction drive motor 119. In addition, the image shake correcting apparatus 100 is provided with an X-direction stage biasing spring (X-supplemental spring) 118 which is extended and installed between the X-direction moving member 116 and the X-direction moving stage 115. The X-direction stage biasing spring 118 biases the X-direction moving stage 115 in the leftward direction as viewed from front of the zoom lens 30 in the X-axis direction relative to the X-direction moving member 116. Accordingly, the X-direction moving stage 115 is biased leftward in the X-axis direction by the X-direction stage biasing spring 118, which brings the positioning flange 115*d* into abutment against the positioning flange 116*b* of the X-direction moving member 116, so that the positioning flange 115*d* is resiliently connected to the positioning flange 116*b* with the position of the positioning flange 115*d* in the X-axis direction being defined thereby. The X-direction moving member 116 is biased rightward in the X-axis direction relative to the stationary holder 107 by the X-direction coupling extension spring 117, which brings the nut contacting portion 116*d* into abutment against the X-direction driven nut member 121 so that the rightward movement of the nut contacting portion 116*d* in the X-axis direction is limited by the X-direction driven nut member 121. Accordingly, the X-direction moving stage 115 is resiliently coupled to the X-direction moving member 116, moves in the X-axis direction following movement of the X-direction moving member 116, and the position of the X-direction moving stage 115 is defined.

The X-direction moving stage 115 is provided at opposite ends thereof in the X-direction with a pair of Y-direction guide rods (long and short guide rods) 127*a* and 127*b* which extend in the Y-axis direction (i.e., in a direction parallel to the Y-axis). The Y-direction moving stage 109 is provided as a pair of guides with a guide hole 109*f* and a guide groove 109*e* into which the pair of Y-direction guide rods 127*a* and 127*b* are inserted, respectively, so that the Y-direction moving stage 109 is supported by the pair of Y-direction guide rods 127*a* and 127*b* to be freely movable along the Y-axis direction.

The image shake correcting apparatus 100 is provided with a Y-direction stage biasing spring (Y-biasing spring) 112 which is extended and installed between the X-direction moving stage 115 and the Y-direction moving stage 109. The Y-direction moving stage 109 is continuously biased downward relative to the X-direction moving stage 115.

The image shake correcting apparatus 100 is provided on the right side of the Y-direction moving stage 109 with a first Y-direction moving member (first Y-supplemental slider) 110 which extends in the Y-axis direction and is supported by the pair of Y-direction guide rods 125*a* and 125*b* to be freely movable in the Y-axis direction. The image shake correcting apparatus 100 is provided on the right side of the first Y-direction moving member 110 with a second Y-direction moving member 111. The second Y-direction moving member 111 is provided at the lower end thereof with a positioning flange 111*a* from which a guide pin projects downward, and this guide pin is slidably inserted into a guide hole formed through a positioning flange 110*a* formed at the lower end of the first Y-direction moving member 110. The first Y-direction moving member 110 is provided at the upper end thereof with a positioning flange 110*b* from which a guide pin projects upward, and this guide pin is slidably inserted into a guide hole formed through the a positioning flange (nut contacting portion) 111*b* formed at the upper end of the second Y-direction moving member 111. With this guide structure using the aforementioned two guide pins and the aforementioned two guide holes, the Y-direction moving member 111 is supported by the first Y-direction moving member 110 to be freely movable in the Y-axis direction relative to the first Y-direction moving member 110.

The image shake correcting apparatus 100 is provided with a Y-direction coupling extension spring 113 which is extended and installed between the first Y-direction moving member 110 and the second Y-direction moving member 111.

The Y-direction coupling extension spring 113 is an extension coil spring and biases the first Y-direction moving member 110 upward in the Y-axis direction relative to the second Y-direction moving member 111, which brings the positioning flanges 110*b* and 111*b* into abutment against each other, so that the positioning flanges 110*b* and 111*b* are resiliently coupled to each other with the positions thereof in the Y-axis direction being defined thereby.

The first Y-direction moving member 110 is provided with a motion transfer surface 110*c* provided on a projection that extends toward the Y-direction moving stage 109. The Y-direction moving stage 109, which is biased downward by the Y-direction stage biasing spring 112, is provided at the upper right corner with respect to FIG. 7 with a transfer roller 114 which is in contact with the motion transfer surface 110*c*. The biasing force (spring force) of the Y-direction coupling extension spring 113 is predetermined to be greater than that of the Y-direction stage biasing spring 112. Therefore, the first Y-direction moving member 110 is resiliently coupled to the second Y-direction moving member 111 with the positioning flange 110*b* abutting against the positioning flange (nut contacting portion) 111*b* by the tensile force of the Y-direction coupling extension spring 113, and the motion transfer surface 110*c* holds the Y-direction moving stage 109 in a resiliently coupled state where the motion transfer surface 110*c* extends the Y-direction stage biasing spring 112 via the transfer roller 114, and defines the position of the Y-direction moving stage 109 in the Y-axis direction.

The motion transfer surface 110*c* is formed parallel to a plane defined by both the X-axis and the Z-axis, and the transfer roller 114 is fitted on a shaft extending parallel to the Z-axis direction to be freely rotatable thereon. Accordingly, even if the Y-direction moving stage 109 moves in the X-axis direction, the transfer roller 114 rolls on the motion transfer surface 110*c* while maintaining in contact therewith. On the other hand, when the first Y-direction moving member 110 moves in the Y-axis direction, the transfer roller 114 moves in the Y-axis direction while remaining in contact with the motion transfer surface 110*c*.

The image shake correcting apparatus 100 is provided with the aforementioned X-direction drive motor 119 serving as a drive source for driving the image sensor 101 in the X-axis direction and a Y-direction drive motor 122 serving as a drive source for driving the image sensor 101 in the Y-axis direction. The X-direction drive motor 119 and the Y-direction drive motor 122 are fixed to a motor bracket integrally formed on the stationary holder 107. Each of the X-direction drive motor 119 and the Y-direction drive motor 122 is a stepping motor. A drive shaft (rotary shaft) of the X-direction drive motor 119 is threaded to serve as a feed screw 119*a*, and a drive shaft (rotary shaft) of the Y-direction drive motor 122 is threaded to serve as a feed screw 122*a*. The feed screw 119*a* is screwed into a female screw hole of the X-direction driven nut member 121 and the feed screw 122*a* is screwed into a female screw hole of a Y-direction driven nut member 124. The position of the X-direction moving member 116 in the X-axis direction is defined by the contact engagement of the nut contacting portion 116*d* of the X-direction moving member 116 with the X-direction driven nut member 121. The position of the Y-direction moving member 111 in the Y-axis direction is defined by the contact engagement of the positioning flange (nut contacting portion) 111*b* of the Y-direction moving member 111 with the Y-direction driven nut member 124.

The image sensor 101 and other elements associated with the image sensor 101 such as the low-pass filter 103 are fixed to the Y-direction moving stage 109. Accordingly, the image sensor 101 is supported by the stationary holder 107 to be movable relative to the stationary holder 107 in the X-axis direction and the Y-axis direction (which are orthogonal to each other in a plane orthogonal to the photographing optical axis Z1) via the Y-direction moving stage 109 and the X-direction moving stage 115. The Y-direction moving stage 109 is provided above the image sensor 101 with an opening 109*h* from which the first jutting portion 102*b*, the second jutting portion 102*d* and the connecting portion 102*c* of the flexible PWB 102 are extended forward, toward the object side from the rear of the image sensor 101.

In the above described image shake correcting apparatus 100, driving the X-direction drive motor 119 to rotate the drive shaft thereof (the feed screw 119*a*) causes the X-direction driven nut member 121, that is screw-engaged with the feed screw 119*a*, to move linearly in the X-axis direction, thus causing the X-direction moving member 116 and the X-direction moving stage 115 to move in the X-axis direction. For instance, moving the X-direction driven nut member 121 leftward as viewed from front of the zoom lens 30 (i.e., rightward as viewed from rear of the zoom lens 30) causes the X-direction moving member 116 to move leftward as viewed from front against the spring force of the X-direction coupling extension spring 117 and further causes the X-direction moving stage 115, which is resiliently coupled to the X-direction moving member 116 by the biasing force of the X-direction stage biasing spring 118, to integrally move with the X-direction moving member 116 in the same direction. Conversely, moving the X-direction driven nut member 121 rightward as viewed from front of the zoom lens 30 (i.e., leftward as viewed from rear of the zoom lens 30) causes the X-direction moving member 116 to move rightward as viewed from front following the movement of the X-direction driven nut member 121 by the biasing force of the X-direction coupling extension spring 117 and consequently causes the X-direction moving stage 115 to integrally move rightward with the X-direction moving member 116 as viewed from the front while being restrained by the X-direction moving member 116.

Driving the Y-direction drive motor 122 to rotate the drive shaft thereof (the feed screw 122*a*) causes the Y-direction driven nut member 124, that is screw-engaged with the feed screw 122*a*, to move linearly in the Y-axis direction, thus causing the first Y-direction moving member 110 and the second Y-direction moving member 111 to move in the Y-axis direction to thereby move the Y-direction moving stage 109 in the Y-axis direction. For instance, moving the Y-direction driven nut member 124 upward causes the second Y-direction moving member 111, movement of which in the Y-axis direction is limited by the Y-direction driven nut member 124, and the first Y-direction moving member 110, which is resiliently connected to the second Y-direction moving member 111 by the Y-direction coupling extension spring 113, to move together upward in the Y-axis direction, which causes the motion transfer surface 110*c* to press the transfer roller 114, thus causing the Y-direction moving stage 109 to move upward in the Y-axis direction against the biasing force of the Y-direction stage biasing spring 112 (while extending the Y-direction stage biasing spring 112). Conversely, moving the Y-direction driven nut member 124 downward causes the transfer roller 114, the first Y-direction moving member 110, which is biased downward via the motion transfer surface 110*c*, and the second Y-direction moving member 111, which is coupled to the first Y-direction moving member 110 by the Y-direction coupling extension spring 113, to move together downward by the biasing force of the Y-direction stage biasing spring 112, following the movement of the Y-direction driven nut member 124.

According to the above described structure of the image shake correcting apparatus 100, the X-direction moving stage 115, together with the Y-direction stage 109 that is supported by the X-direction moving stage 115, can be moved forward and reverse in the X-axis direction by driving the X-direction drive motor 119 forward and reverse, respectively, and the Y-direction stage 109 can be moved forward and reverse in the Y-axis direction by driving the Y-direction drive motor 122 forward and reverse, respectively.

Each of the Y-direction moving stage 109 and the X-direction moving stage 115 can move in the Y-axis direction and the X-axis direction, respectively, upon receiving an external force. For instance, when forced upward in the Y-axis direction, the Y-direction moving stage 109 moves upward against the biasing force of the Y-direction stage biasing spring 112 (while extending the Y-direction stage biasing spring 112) to thereby disengage the transfer roller 114 from the motion transfer surface 110*c*. On the other hand, when forced downward in the Y-axis direction, the Y-direction moving stage 109 moves the first Y-direction moving member 110 downward via the transfer roller 114 and the motion transfer surface 110*c* against the biasing force of the Y-direction coupling extension spring 113.

Regarding the X-direction moving stage 115, when forced leftward in the X-axis direction, the X-direction moving stage 115 moves leftward in the X-axis direction while moving the X-direction moving member 116 in the same direction against the biasing force of the X-direction coupling extension spring 117 (while extending the X-direction coupling extension spring 117). On the other hand, when forced rightward in the X-axis direction, the X-direction moving stage 115 moves rightward in the X-axis direction against the biasing force of the X-direction stage biasing spring 118 (while extending the X-direction stage biasing spring 118).

[Mounting Structure of the Flexible PWB 102]

Figure 8:
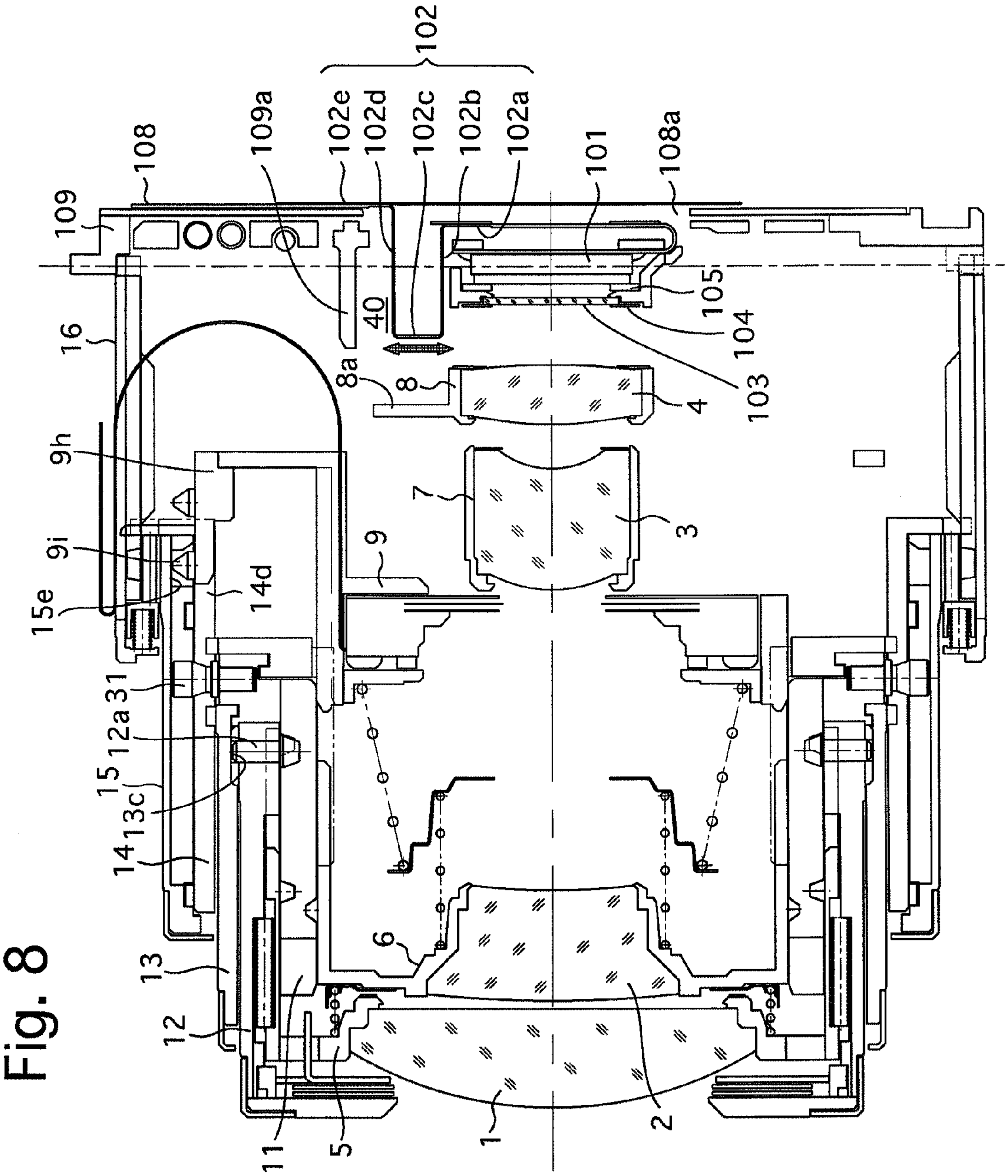
FIG. 8 is a longitudinal sectional view of the zoom lens barrel set at the wide-angle extremity in a ready-to-photograph state, showing the bending directions of the flexible wiring board.

FIG. 8 shows a state where the first jutting portion 102*b*, the second jutting portion 102*d* and the connecting portion 102*c*, each of which forms part of the flexible PWB 102, are elastically bent in an allowance space 40 secured in the zoom lens 30 in a state where the zoom lens 30 is set at the wide-angle extremity in a ready-to-photograph state. The allowance space 40 is defined between the image sensor 101 and the inner peripheral surface of the third lens group moving ring (innermost ringmember) 9. In the fully-retracted state of the zoom lens 30, the allowance space 40 (that accommodates the first jutting portion 102*b*, the second jutting portion 102*d* and the connecting portion 102*c* of the flexible PWB 102) is further defined by the flange 8*a* of the AF lens group frame 8 that supports the fourth lens group 4, the image sensor holder 105 and a guide member (guard member) 109*a*.

FIGS. 9A through 12B show the laying structure (installation structure) of the flexible PWB 102. The image sensor connecting portion 102*a* is connected to a terminal drawn out of the back of the image sensor 101. In the flexible PWB 102, the first jutting portion 102*b* that is continuous with the image sensor connecting portion 102*a* is extended toward the object side from the opening 109*h*, which is provided above the image sensor 101, into the zoom lens 30. The first jutting portion 102*b* is extended toward the object side in a direction substantially parallel to the photographing optical axis Z1, the connecting portion 102*c* extends upwards in a direction away from the photographing optical axis Z1 from the front end of the first jutting portion 102*b*, the second jutting portion 102*d* extends rearward in a direction substantially parallel to the photographing optical axis Z1, and the rear end of the second jutting portion 102*d* extends rearwardly through the flexible-PWB holding plate 105*a* and an opening 108*a* formed through the protective metal plate 108 so as to be continuous with the control circuit connecting portion (outer side connecting portion) 102*e*.

As shown in FIG. 8, the first jutting portion 102*b*, the second jutting portion 102*d* and the connecting portion 102*c* are positioned in the allowance space 40 in the zoom lens 30, thus capable of bending freely in the vertical and twisting directions. In addition, the control circuit connecting portion 102*e* is connected to the control circuit C (e.g., a CPU) that is electrically connected to the image sensor 101 via a flexible PWB (Printed Wiring Board) (FPC board) 102.

In this manner, according to the flexible wiring board mounting structure to which the present invention is applied, the pair of jutting portions 102*b* and 102*d* and the connecting portion 102*c*, which are used to connect the image sensor 101 and the aforementioned control circuit to each other, extend forward into an internal space of the zoom lens 30 in front of the image sensor in the optical axis direction from the opening 109*h* (see FIG. 1) of the Y-direction moving stage 109, so that no part of the flexible PWB 102 needs to be positioned radially outside the stationary barrel 16 unlike in the related art. Accordingly, the length of the flexible PWB 102 can be reduced while the load caused by bending of the flexible PWB 102 is minimized, thereby making it possible to miniaturize the camera itself. Due to this achievement of a reduction in length of the flexible PWB 102, the material of the flexible PWB 102 is cut down while the chances of noise contamination are reduced.

Figure 9A:
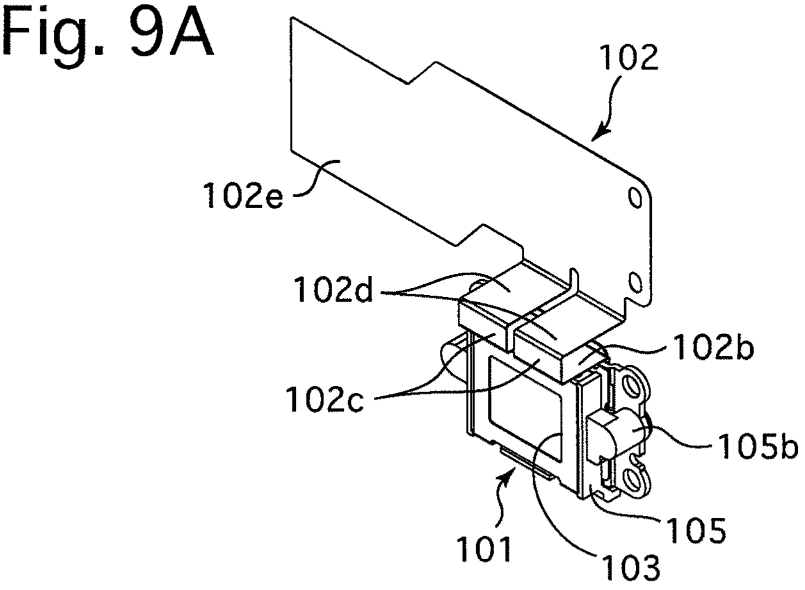
FIG. 9A is a perspective view of an image sensor (image sensor unit) before it is mounted to the image shake correcting unit, viewed obliquely from the object side.
Figure 9B:
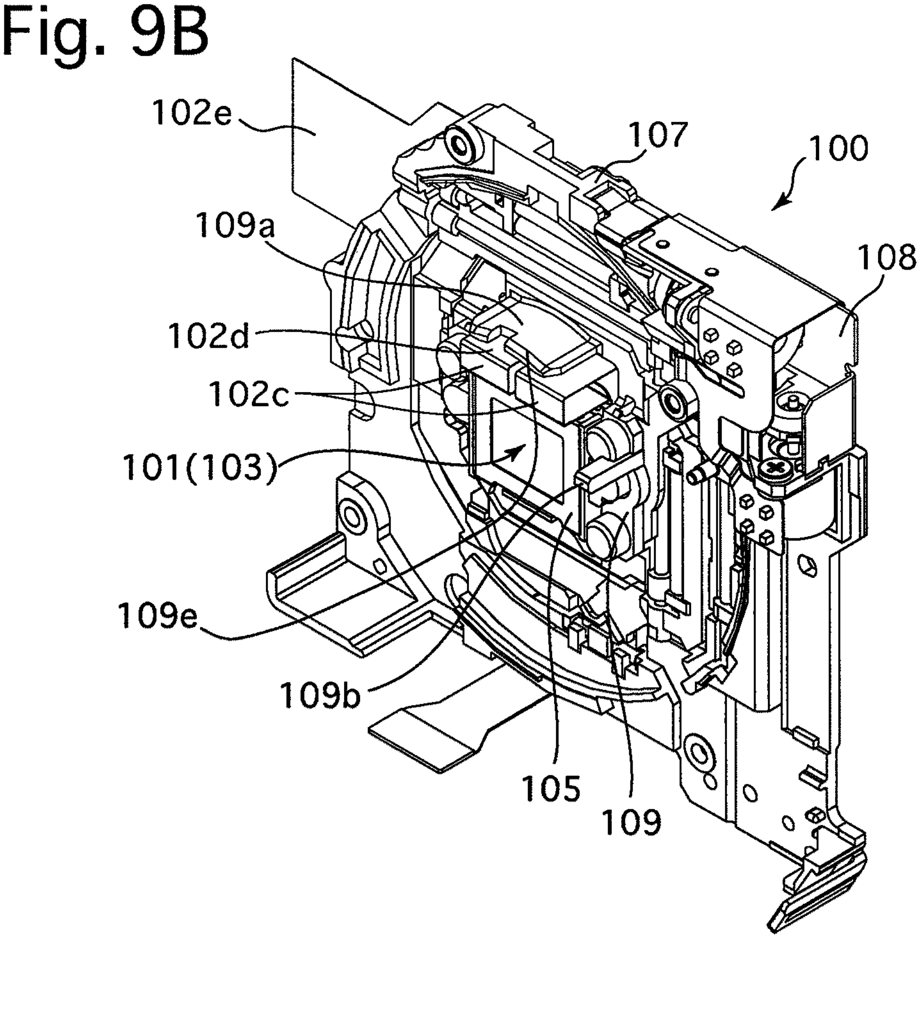
FIG. 9B is a perspective view of the image shake correcting unit after the image sensor is mounted thereto, viewed obliquely from the object side.
Figure 10A:
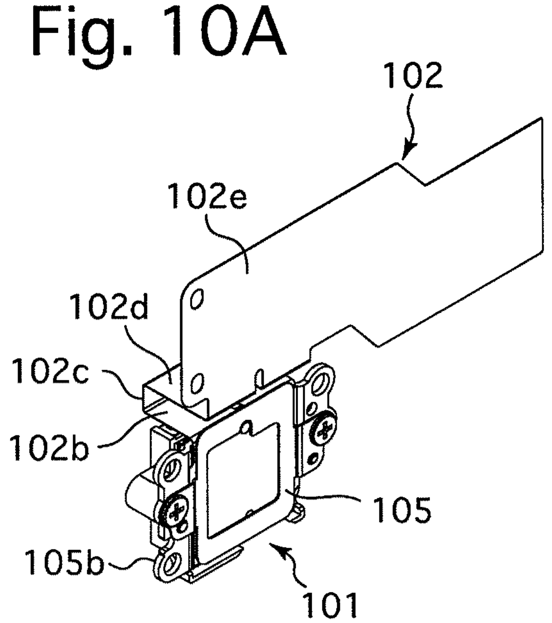
FIG. 10A is a perspective view of the image sensor (image sensor unit) before it is mounted to the image shake correcting unit, viewed obliquely from the rear of the zoom lens barrel.
Figure 10B:
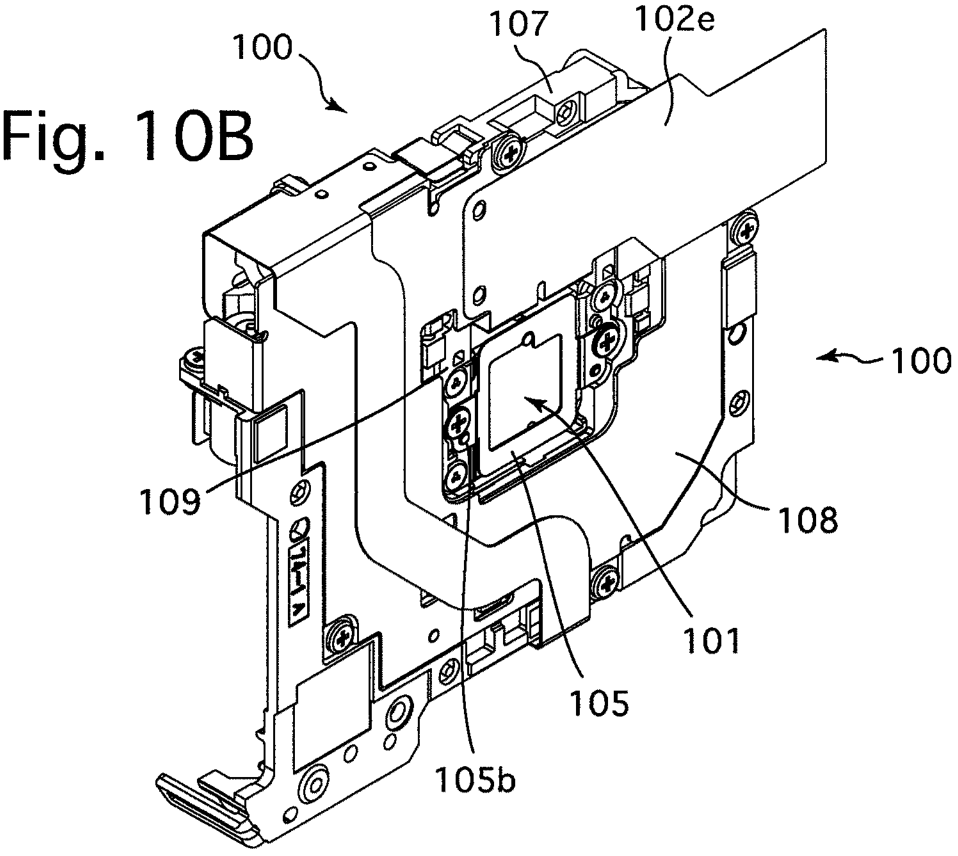
FIG. 10B is a perspective view of the image shake correcting unit after the image sensor is mounted thereto, viewed obliquely from the rear of the zoom lens barrel.
Figure 11A:
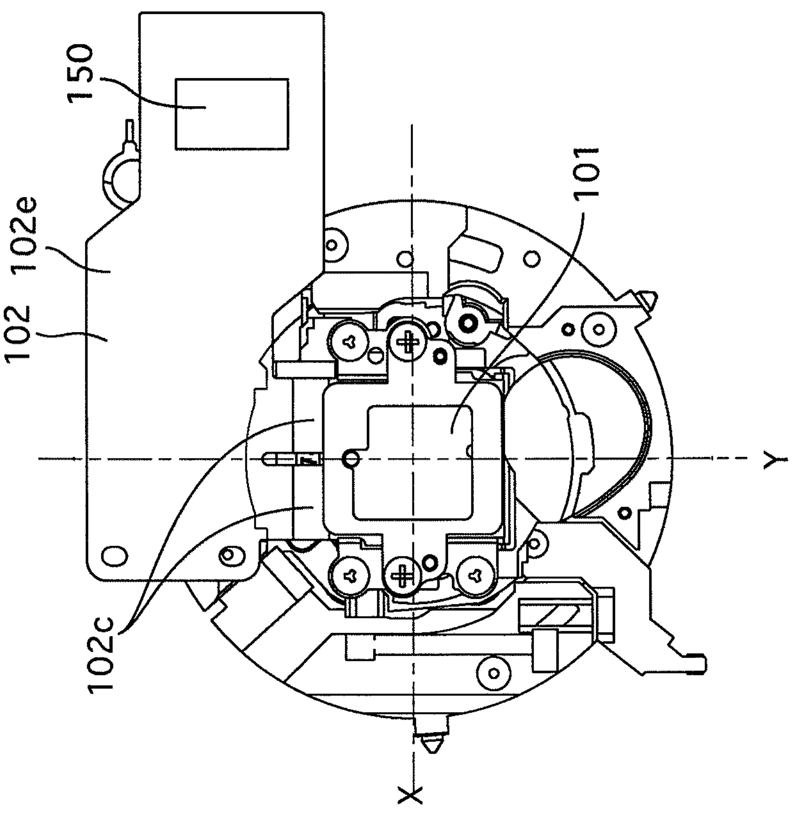
FIG. 11A is a rear elevational view of a main portion of the image shake correcting unit before a protective plate is mounted to the image shake correcting unit.
Figure 11B:
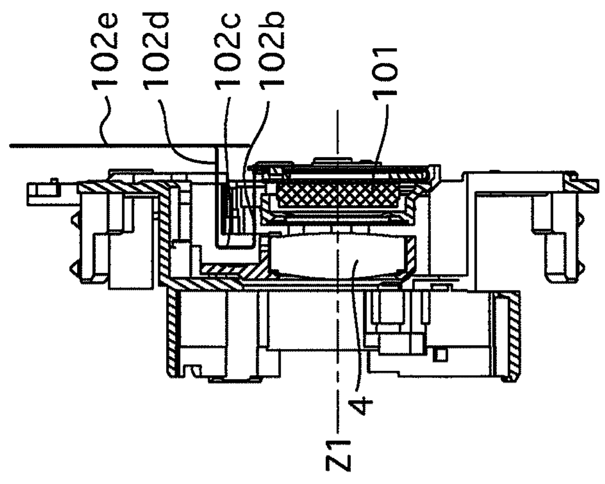
FIG. 11B is a cross sectional view taken along the Y-axis shown in FIG. 11A.
Figures 12A, 12B:
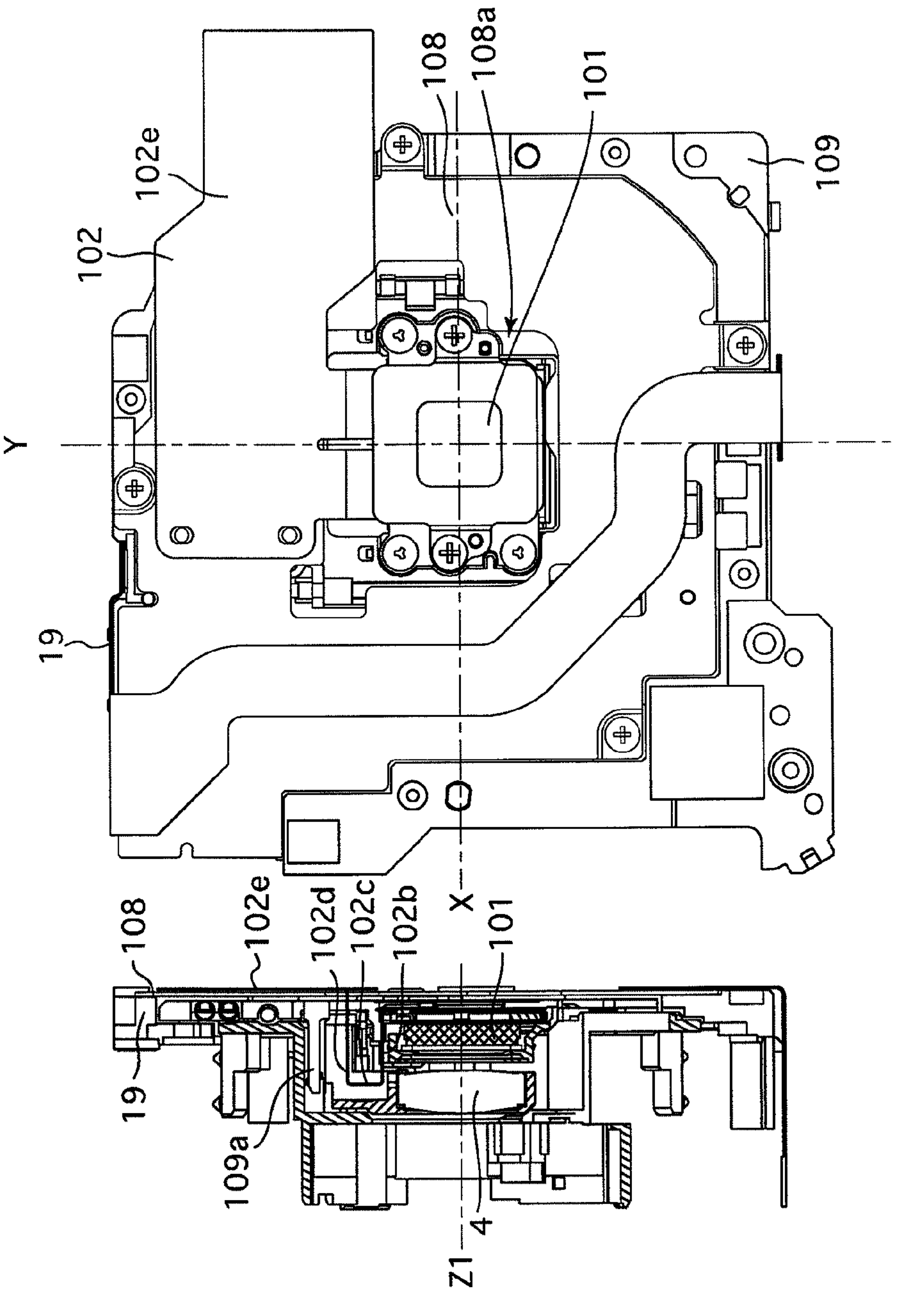
FIG. 12A is a rear elevational view of the main portion of the image shake correcting unit after the protective plate is mounted to the image shake correcting unit.
FIG. 12B is a cross sectional view taken along the Y-axis shown in FIG. 12A.

In the above described embodiment, the portion of the flexible PWB 102 which includes the first jutting portion 102*b*, the second jutting portion 102*d* and the connecting portion 102*c* is split into two by formation of a slit at the center thereof (see FIG. 9A). This splitting structure allows the portion of the flexible PWB 102 including the first jutting portion 102*b*, the second jutting portion 102*d* and the connecting portion 102*c* to easily to twist. Although split into two portions in the drawings, the aforementioned portion can be split into more than two portions, or none at all.

[The Flexible PWB Protection Structure and Forced Shifting (Initializing) Structure of Image Sensor 101 When Zoom Lens is Accommodated (Fully Retracted)]

In the present embodiment, the flexible portion of the flexible PWB 102 that includes the first jutting portion 102*b*, the second jutting portion 102*d* and the connecting portion 102*c* has the above described folded shape and is thus easy to move in the upward/downward direction. However, when the zoom lens 30 is fully retracted, there is a possibility of this flexible portion interfering with the third lens group moving ring 9 because the third lens group moving ring 9 is positioned immediately above the first jutting portion 102*b*, the second jutting portion 102*d* and the connecting portion 102*c*. If the flexible PWB 102 comes into contact with the third lens group moving ring 9, the wiring contained in the flexible PWB 102 may break or become damaged. To prevent this problem from occurring, the Y-direction moving stage 109 is provided, on a side thereof which faces toward the object side, with the guide member (guard member) 109*a* for protecting the first jutting portion 102*b*, the second jutting portion 102*d* and the connecting portion 102*c*.

Figure 13A:
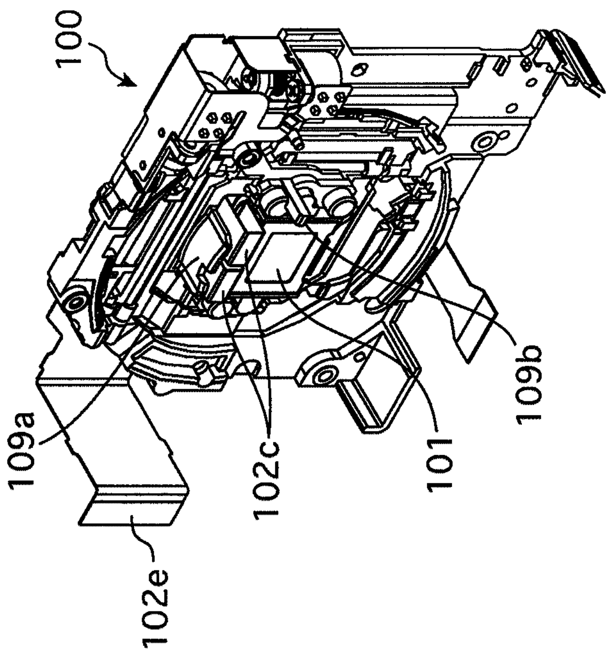
FIG. 13A is a perspective view of the main portion of the image shake correcting apparatus, viewed obliquely from the object side.
Figure 13B:
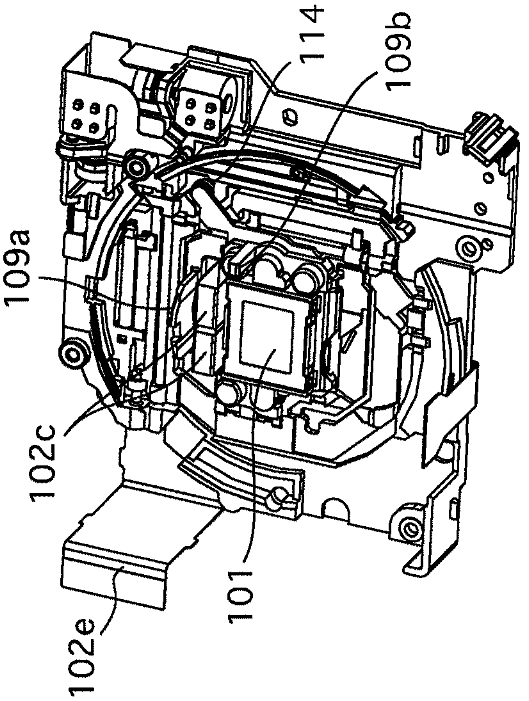
FIG. 13B is a perspective view of the main portion of the image shake correcting apparatus, viewed obliquely from the object side from a different position from that of FIG. 13A.
Figure 14A:
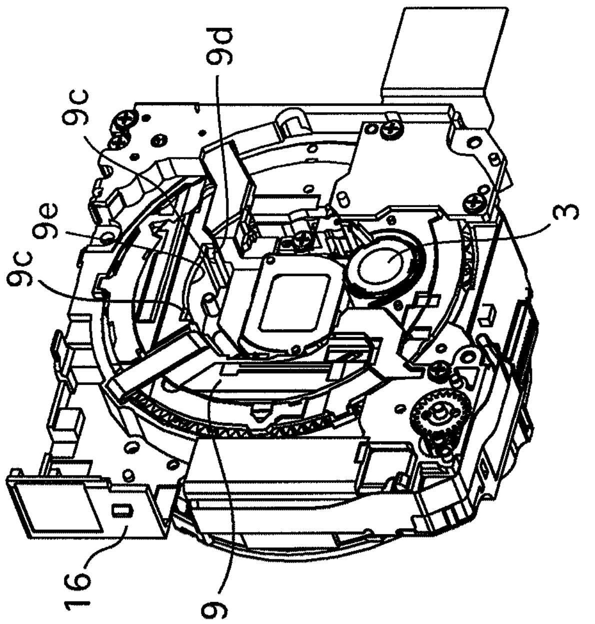
FIG. 14A is a perspective view of part of the image shake correcting apparatus in a state where the third lens group has been slidingly displaced to the off-axis displaced position, showing the back of the third lens group moving ring, viewed obliquely from the rear.
Figure 14B:
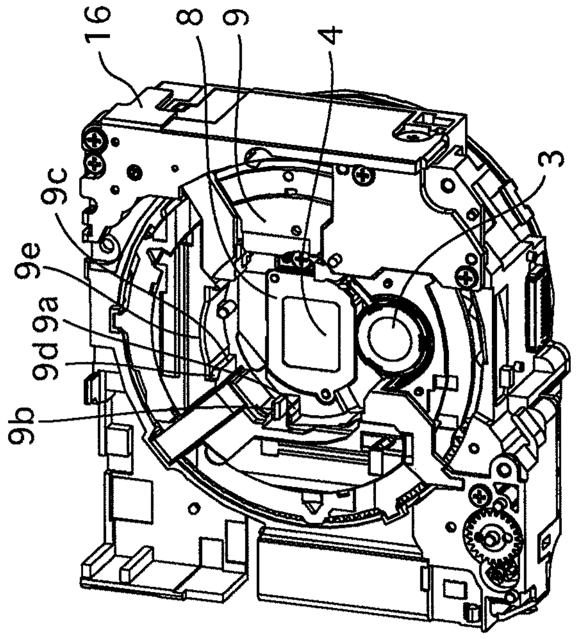
FIG. 14B is a perspective view of the portion of the image shake correcting apparatus shown in FIG. 14B, viewed obliquely from the rear from a different position from FIG. 14A.

In a state where the image shake correcting apparatus 100 is in an initial (normal) position, the guide member 109*a* that is integrally formed with the Y-direction moving stage 109 extends forward in the optical axis direction so as to be positioned above the first jutting portion 102*b*, the second jutting portion 102*d* and the connecting portion 102*c*. The guide member 109*a* protects the first jutting portion 102*b*, the second jutting portion 102*d* and the connecting portion 102*c* and also serves as an element of a forced shifting (initializing) mechanism for moving (shifting) the Y-direction moving stage 109 to an initial position in the X-axis direction when the zoom lens 30 is accommodated (fully retracted). This mechanism will be discussed in detail with reference further to FIGS. 13A through 16C(5). FIGS. 13A and FIG. 13B are front perspective views of the main components of the image shake correcting apparatus 100, viewed obliquely from different angles. FIGS. 14A and 14B are rear perspective views of the main components of the image shake correcting apparatus 100 in a state where the third lens group 3 has been slidingly displaced to the off-axis displaced position, showing the back of the third lens group moving ring 9, viewed obliquely from different angles. In FIGS. 15A(1) through 16C(5), 15A(1) through 15A(5) and 16A(1) through 16A(5) are front elevational views of the image shake correcting apparatus 100, 15B(1) through 15B(5) and 16B(1) through 16B(5) are side elevational views of the main components of the image shake correcting apparatus 100, and 15C(1) through 15C(5) and 16C(1) through 16C(5) are plan views of the main components of the image shake correcting apparatus 100.

The Y-direction moving stage 109 is provided, on a side thereof which faces the object side, with the guide member (first guide member) 109*a* and a guide projection (second guide member) 109*b* that serve as elements of a guide mechanism for guiding the Y-direction moving stage 109 to the initial position thereof when the zoom lens 30 is accommodated (fully retracted). The guide member 109*a* is provided at the upper front edge thereof with an upper-edge beveled surface 109*e*. The front end of the guide projection 109*b* is chamfered. When the zoom lens 30 is accommodated (fully retracted) from a ready-to-photograph position (wide-angle extremity position), a pair of guide surfaces (forced-driving portions) 9*c*, a pair of guide edges (forced-driving portions) 9*d* and a guide upper edge (forced-driving portion) 9*e* which are formed on the third lens group moving ring 9 come into contact with the guide member 109*a* while two guide plates (lower and upper guide plates/second forced-driving portions) 9*a* and 9*b* which are formed on the third lens group moving ring 9 come into contact with the guide projection 109*b* to force the Y-direction moving stage 109 to shift to the initial position thereof. As shown in FIGS. 15C(1) through (5) and 16C(1) through (5), the pair of guide edges 9*d* are beveled surfaces which are formed symmetrical with respect to the photographing optical axis Z1, tapering toward the front in the optical axis direction.

The third lens group moving ring 9 is guided linearly in the optical axis direction by the first linear guide ring 14, and the position of the third lens group moving ring 9 in the optical axis direction is controlled by the plurality of third-lens-group guide cam grooves 15*e* of the helicoid ring 15. Accordingly, when the zoom lens 30 is accommodated, the first linear guide ring 14 retreats linearly in accordance with rotation of the helicoid ring 15. The third lens group moving ring 9 is provided with the pair of guide surfaces 9*c* which come in contact with both side surfaces of the guide member 109*a*, respectively, when the third lens group moving ring 9 is in the accommodated position (fully retracted position), and is further provided with the lower guide plate 9*a* and the upper guide plate 9*b* which project forward so that the guide projection 109*b* enters therebetween when the third lens group moving ring 9 is in the accommodated position (fully retracted position). An edge of the third lens group moving ring 9 which connects the pair of guide surfaces 9*c* to each other defines guide upper edge 9*e*, and rear ends of the pair of guide surfaces 9*c* define the pair of guide edges 9*d*. The guide upper edge 9*e* is shaped into a circular arc having a curvature substantially the same as the curvature of the outer peripheral surface of the guide member 109*a*. The lower guide plate 9*a*, which is positioned closer from the photographing optical axis Z1 than the upper guide plate 9*b*, is greater in length in the optical axis direction than the upper guide plate 9*b*. An accommodation space 9*g* for accommodating the pair of jutting portions 102*b* and 102*d* and the connecting portion 102*c* of the flexible PWB 102 in the fully retracted state of the zoom lens 30 is formed between the lower guide plate 9*a*, the upper guide plate 9*b* and the pair of guide surfaces 9*c*.

Operations of the zoom lens 30 to move the image sensor 101 to the initial position thereof when the zoom lens 30 is accommodated (fully retracted) from a ready-to-photograph state will be discussed in detail with reference further to FIGS. 15A(1) through 16C(5). FIG. 15A(1) through 15C(5) show sequential operations of main elements of the zoom lens 30 when the zoom lens 30 is accommodated from a state where the Y-direction moving stage 109 has shifted (deviated) leftward in the X-axis direction and upward in the Y-axis direction as viewed from front and not returned to the initial position. In these operations, the pair of jutting portions 102*b* and 102*d* and the connecting portion 102*c* of the flexible PWB 102 are positioned below the guide member 109*a* with respect to FIGS. 15B(1) through 158(5) and 16B(1) through 16B(5) although not shown in these drawings.

A retracting movement of the third lens group moving ring 9 causes the upper-edge beveled surface 109*e* of the guide member 109*a* to come into contact with the guide upper edge 9*e* of the third lens group moving ring 9 (see FIG. 15B(2)) and causes the left corner edge of the upper-edge beveled surface 109*e* of the guide member 109*a* to come into contact with the left guide edge 9*d* (see FIG. 15C(2)). A further retracting movement of the third lens group moving ring 9 causes the upper-edge beveled surface 109*e* of the guide member 109*a* to be guided downward (toward the center, i.e., the photographing optical axis Z1) by the guide upper edge 9*e* of the third lens group moving ring 9 so that the Y-direction moving stage 109 moves downward and causes the left corner edge of the upper-edge beveled surface 109*e* of the guide member 109*a* to be guided by the left guide edge 9*d* so that the Y-direction moving stage 109 moves rightward (toward the center, i.e., the photographing optical axis Z1) (see FIGS. 15A(3), 15B(3) and 15C(3)). In this state, the guide projection 109*b* is aligned at a middle position between the lower guide plate 9*a* and the upper guide plate 9*b* (see FIG. 15B(3)).

A further retracting movement of the third lens group moving ring 9 causes the side end surfaces of the guide member 109*a* to come into contact with the pair of guide surfaces 9*c*, respectively, so that the Y-direction moving stage 109 moves to the initial position thereof in the X-axis direction and further causes the guide projection 109*b* to come into contact with the front end of the upper guide plate 9*b*, thus causing the guide projection 109*b* to move downward. Subsequently, a further retracting movement of the third lens group moving ring 9 causes the guide projection 109*b* to enter in between the lower guide plate 9*a* and the upper guide plate 9*b*. Due to such operations, the Y-direction moving stage 109 moves to the initial position thereof in the Y-axis direction (see FIGS. 15A(4), 15B(4) and 15C(4)).

Thereafter, from this state, the third lens group moving ring 9 retracts to the accommodated position (fully retracted position) (see FIGS. 15A(5), 15B(5) and 15C(5)). When the zoom lens 30 is in the accommodated state, each of the Y-direction moving stage 109 and the X-direction moving stage 115 (i.e., the image sensor 101) has been returned to the initial position thereof so that the photographing optical axis Z1 passes through the center of the imaging surface of the image sensor 101. In a state where the image sensor 101 has been forcibly returned to the initial position thereof, the positioning flange 115*d* of the X-direction moving stage 115 and the positioning flange 116*b* of the Y-direction moving stage 109 are spaced apart from each other while the positioning flange 110*b* of the first Y-direction moving member 110 and the positioning flange (nut contacting portion) 111*b* of the second Y-direction moving member 111 are spaced apart from each other.

In the case where the Y-direction moving stage 109 has shifted (deviated) downward as viewed from front and leftward in the X-axis direction, the Y-direction moving stage 109 is returned to the initial position thereof upon the zoom lens 30 being accommodated (see FIGS. 16A(1) through 16C(5)). In this case, in the course of retracting movement of the third lens group moving ring 9, the guide projection 109*b* comes into contact with the lower guide plate 9*a*, and the Y-direction moving stage 109 moves upward, i.e., moves toward the center (the photographing optical axis Z1) (see FIGS. 16B(2) and 16B(3)). Upon the Y-direction moving stage 109 moving upward, the guide member 109*a* and the pair of guide surfaces 9*c* that are spaced apart from each other come into engagement with each other; in addition, regarding movement of the Y-direction moving stage 109 in the leftward/rightward direction (the X-axis direction), the Y-direction moving stage 109 moves to the initial position thereof in the X-axis direction with the guide member 109*a* being guided by the pair of guide surfaces 9*c* in a similar manner to the above described manner that is shown in FIGS. 15A(1) through 15C(5).

Thereupon, full retraction of the third lens group moving ring 9 to the accommodated position thereof causes the image sensor 101 (the X-direction moving stage 115 and the Y-direction moving stage 109) to move to an initial state thereof, i.e., the initial position (see FIGS. 16A(5), 16B(5) and 16C(5)). In this state where the image sensor 101 has been forced to shift to the initial position, the positioning flange 115*d* of the X-direction moving stage 115 and the positioning flange 116*b* of the X-direction moving member 116 are spaced apart from each other while the transfer roller 114 is disengaged from the motion transfer surface 110*c*.

As described above, the flexible PWB mounting structure according to the present invention can protect the above described flexible portion of the flexible PWB 102 (which consists of the pair of jutting portions 102*b* and 102*d* and the connecting portion 102*c*) and also shift the image sensor 101 to its initial position, thus contributing to a reduced number of elements of the zoom lens 30.

If the flexible PWB 102 has been mounted so as to incline in the left/right direction, when viewed in the optical axis direction, with respect to the image sensor 101, if the flexible portion were to be provided at a position that is far away from the image sensor 101, this flexible portion would shift greatly from the allowance space for this flexible portion in the left/right direction. Whereas, if the flexible portion (102*b*, 102*c* and 102*d*) is provided close to the image sensor like in the case of the present invention, only a small amount of shifting of the flexible portion (102*b*, 102*c* and 102*d*) from the allowance space 40 would occur.

Although the present invention has been described based on the above illustrated embodiment of the flexible wiring board mounting structure of the image shake correcting apparatus that counteracts image shake by driving an image sensor to move in a direction opposite to that of the shaking motion, the present invention is not limited solely to this particular embodiment; making various modifications to the above illustrated embodiment is possible. Namely, the present invention can also be applied to the image shake correcting apparatus in which a image-stabilizing element and a control circuit mounted to another element independent of the image-stabilizing element are connected to each other via a flexible PWB. Although the pair of jutting portions 102*b* and 102*d* and the connecting portion 102*c* of the flexible PWB 102 are inserted into the opening 109*h* of the Y-direction moving stage 109 in the above illustrated embodiment, the formation of the guide member 109*a* makes it possible to arrange the pair of jutting portions 102*b* and 102*d* and the connecting portion 102*c* of the flexible PWB 102 in between moving members of the zoom lens 30, e.g., especially the AF lens group frame 8 and the third lens group moving ring 9. Conventionally, a flexible PWB could not be provided in the vicinity of a moving member or members of a lens barrel because a flexible PWB would be easily damaged or break by interfering with such a moving member or members if so arranged. Additionally, a flexible PWB could not be arranged inside a cam ring of a lens barrel because a moving member or members are positioned inside the cam ring.

Note that in the above described embodiment of the zoom lens 30, the guide member 109*a* has been provided due to the third lens group moving ring 9 (constituting an innermost ring member) being movable in the optical axis direction; however, such a guide member (109*a*) is not necessary in the case where the innermost ring member does not move in the optical axis direction. Furthermore, the lens group which is supported by the innermost ring member can be a single lens element.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A flexible wiring board mounting structure of an image shake correcting apparatus, said image shake correcting apparatus including an image sensor serving as a part of a photographing optical system and capable of moving in directions orthogonal to an optical axis of said photographing optical system, a control circuit mounted to an element independent of said image sensor, and a flexible wiring board which connects said image sensor and said control circuit to each other, wherein said photographing optical system includes a plurality of lens groups, each of which is supported by a ring member, and wherein said flexible wiring board comprises:

- an inner side connecting portion connected to said image sensor;
- an outer side connecting portion connected to said control circuit; and
- a flexible portion provided in an allowance space, wherein said allowance space is defined between said inner side connecting portion, said outer side connecting portion, said image sensor and a cylindrical inner peripheral surface of an innermost ring member, out of said ring members that support said plurality of lens groups of said photographing optical system, the flexible portion comprising:
  - a first jutting portion which that is flexible and is bent at an end of said inner side connecting portion to extend forward in said optical axis direction within said allowance space, a second jutting portion which that is flexible and is folded back to extend rearward in said optical axis direction at a position radially outward from a position of said first jutting portion, a rear end of said second jutting portion being bent in a direction away from said optical axis to be continuous with said outer side connecting portion, and a flexible connecting portion connecting said first jutting portion to said second jutting portion, thereby defining said flexible portion.

2. The flexible wiring board mounting structure according to claim 1, wherein said flexible connecting portion is connected to said first jutting portion and said second jutting portion so as to connect front ends of said first jutting portion and said second jutting portion to each other, wherein said second jutting portion is folded back from said first jutting portion via said connecting portion, and said flexible connecting portion extending in a direction substantially orthogonal to said optical axis.

3. The flexible wiring board mounting structure according to claim 1, wherein said innermost ring member is movable in the optical axis direction, and wherein a guard member is provided between said flexible portion and said cylindrical inner peripheral surface of said innermost ring member.

4. The flexible wiring board mounting structure according to claim 1, wherein said image sensor is provided on one of a pair of mutually parallel in-plane moving members which move relative to each other in mutually orthogonal directions to each other, while maintaining a parallel state with each other and lying on planes that are orthogonal to the optical axis, wherein said flexible portion extends forward in the optical axis direction through an opening provided in at least one of said mutually parallel in-plane moving members.

5. The flexible wiring board mounting structure according to claim 4, wherein said image shake correcting apparatus comprises a pair of mutually parallel in-plane moving members which move relative to each other in two orthogonal directions while maintaining a parallel state with each other, wherein one of said in-plane moving members is mounted to the other of said in-plane moving members, said image sensor being mounted to said one of said in-plane moving members, and wherein said flexible portion juts forward through an opening formed in said one of said in-plane moving members, to which said image sensor is mounted.

6. The flexible wiring board mounting structure according to claim 5, a guard member is provided in between said innermost ring member and said flexible portion that extends forward in the optical axis direction through said opening.

7. The flexible wiring board mounting structure according to claim 5, wherein said one of said in-plane moving members, to which said image sensor is mounted, comprises a guide member positioned between said flexible portion that extends forward in said optical axis direction and said cylindrical inner peripheral surface of said innermost ring member.

8. The flexible wiring board mounting structure according to claim 6, wherein a lens group, of said plurality of lens groups, that is provided closest to said image sensor is supported by a lens frame having a flange that outwardly and radially extends in a direction orthogonal to said optical axis, and wherein said flexible portion, which juts forward in said optical axis direction through said opening, is positioned in a space defined by said guard member, said image sensor and said flange.

9. The flexible wiring board mounting structure according to claim 4, wherein said image shake correcting apparatus is provided in a retractable zoom lens, and said innermost ring member comprises one of a movable lens barrel and a movable lens support frame that retreats in said optical axis direction when said zoom lens is fully retracted from a ready-to-photograph state to an accommodated state, and wherein, if said image sensor has deviated from an initial position, a forced-driving portion formed on said innermost ring member comes into sliding contact with said guide member to force said image sensor to shift to said initial position when said zoom lens is fully retracted.

10. The flexible wiring board mounting structure according to claim 9, wherein said forced-driving portion and said guide member limit a first movement of said image sensor in one of two directions orthogonal to said optical axis and limit a second movement of said image sensor in the other of said two directions, wherein said two directions are mutually orthogonal to each other.

11. The flexible wiring board mounting structure according to claim 10, wherein said one in-plane moving member, to which said image sensor is mounted, comprises a second guide member formed at a different position from said guide member, wherein a second forced-driving portion is provided on one of said movable lens barrel and said movable lens support frame, and wherein said second guide member and said second forced-driving portion limits said second movement of said image sensor in said other of said two directions.

12. The flexible wiring board mounting structure according to claim 1, wherein at least one slit is formed in said flexible portion to split said flexible portion into at least two portions.

13. The flexible wiring board mounting structure according to claim 1, wherein said flexible portion is positioned radially within a stationary barrel that accommodates said photographing optical system.

14. The flexible wiring board mounting structure according to claim 1, wherein said first jutting portion and said second jutting portion are oriented parallel to each other and adjacent said image sensor.

* * * * *